United States Patent
Fukushima

(10) Patent No.: US 10,606,428 B2
(45) Date of Patent: Mar. 31, 2020

(54) DISPLAY DEVICE WITH TOUCH DETECTION FUNCTION AND ELECTRONIC APPARATUS

(71) Applicant: Japan Display Inc., Tokyo (JP)

(72) Inventor: Toshiaki Fukushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/255,355

(22) Filed: Jan. 23, 2019

(65) Prior Publication Data

US 2019/0155421 A1 May 23, 2019

Related U.S. Application Data

(63) Continuation of application No. 15/806,875, filed on Nov. 8, 2017, now Pat. No. 10,235,001, which is a continuation of application No. 14/152,052, filed on Jan. 10, 2014, now Pat. No. 9,836,168.

(30) Foreign Application Priority Data

Jan. 10, 2013 (JP) .................................. 2013-003005
Jan. 8, 2014 (JP) .................................. 2014-001530

(51) Int. Cl.
   *G06F 3/044* (2006.01)
   *G06F 3/041* (2006.01)
(52) U.S. Cl.
   CPC ............ *G06F 3/044* (2013.01); *G06F 3/0412* (2013.01); *G06F 3/0416* (2013.01)
(58) Field of Classification Search
   CPC ....... G06F 3/044; G06F 3/0416; G06F 3/0412
   See application file for complete search history.

(56) References Cited

U.S. PATENT DOCUMENTS

2012/0262387 A1* 10/2012 Mizuhashi ............ G06F 3/0412
345/173

FOREIGN PATENT DOCUMENTS

| JP | 2012-221485 | 11/2012 |
| JP | 2012-230657 | 11/2012 |
| JP | 2012230657 A * | 11/2012 |

OTHER PUBLICATIONS

Notice of Preliminary Rejection issued in connection with Korean Patent Application 10-2014-0002748, dated May 31, 2015. (6 pages).

* cited by examiner

*Primary Examiner* — Brent D Castiaux
(74) *Attorney, Agent, or Firm* — K&L Gates LLP

(57) ABSTRACT

According to an aspect, a display device with a touch detection function includes a controller, touch wiring that supplies a touch drive signal to drive electrodes, and a plurality of switch groups that are provided for each of the drive electrodes, each of the plurality of switch groups having selection switches. The plurality of switch groups select a drive electrode to be coupled to a touch wiring based on a selection signal from the controller. The selection switches for each of the plurality of switch groups are coupled in parallel with each other between a corresponding drive electrode and the touch wiring, and for each of the drive electrodes, all of the selection switches operate in accordance with the selection signal, couple the corresponding drive electrodes and the touch wiring, and apply the touch drive signal to the corresponding drive electrodes.

11 Claims, 29 Drawing Sheets

DISPLAY DEVICE WITH TOUCH DETECTION FUNCTION AND ELECTRONIC APPARATUS

CROSS REFERENCES TO RELATED APPLICATIONS

The present application is a continuation application of U.S. patent application Ser. No. 15/806,875, filed on Nov. 8, 2017, which is a continuation of U.S. patent application Ser. No. 14/152,052, filed on Jan. 10, 2014, now U.S. Pat. No. 9,836,168 issued on Dec. 5, 2017, which claims priority to Japanese Priority Patent Application JP 2013-003005 filed in the Japan Patent Office on Jan. 10, 2013, and JP 2014-001530 filed in the Japan Patent Office on Jan. 8, 2014, the entire content of which is hereby incorporated by reference.

BACKGROUND

1. Technical Field

The present disclosure relates to a display device and electronic apparatus capable of detecting an externally approaching object, and more particularly, to a display device with a touch detection function and an electronic apparatus capable of detecting an externally approaching object based on a change in electrostatic capacitance.

2. Description of the Related Art

Recently, much attention has been paid to a touch detection device, which is called touch panel, capable of detecting an externally approaching object. The touch panel is used for a display device with a touch detection function in which the touch detection device is attached onto or integrated with display device such as liquid crystal display device. The display device with a touch detection function enable the touch panel to be used for information input as substitutes for conventional mechanical buttons by displaying various button images on the display device. The display device with a touch detection function having such touch panel requires no input devices such as a keyboard, a mouse, and a keypad, thereby tending to be widely used for a portable information terminal such as a portable phone in addition to a computer.

There are several touch detection methods such as optical method, resistive method, and electrostatic capacitance method used for the touch detection device. The touch detection device using the electrostatic capacitance method has relatively simple structures and can achieve low power consumption device when used in the portable information terminal, for example. For example, Japanese Patent Application Laid-open Publication No. 2012-221485 (JP-A-2012-221485) discloses an electrostatic capacitive touch panel.

In the display device with a touch detection function, which integrate therein a display function and a touch detection function, an operation for detecting a touch may influence the display, for example. The display panel with a touch detection function (display device with a touch detection function) disclosed in JP-A-2012-221485 can reduce the influence on the display due to the touch detection. The display panel with a touch detection function disclosed in JP-A-2012-221485 includes a drive unit that selectively applies a direct-current drive signal VcomDC or an alternating-current drive signal VcomAC to a drive electrode. In the display panel with a touch detection function, the drive signal is applied to the drive electrode and a signal according to the drive signal is output from a touch detection electrode while a display element is display-driven. Two wiring for supplying the direct-current drive signal VcomDC and the alternating-current drive signal VcomAC to the drive electrode thus need to be routed in a frame area.

The display panel with a touch detection function disclosed in JP-A-2012-221485 includes a selection switch that selectively supplies the direct-current drive signal VcomDC and the alternating-current drive signal VcomAC to the drive electrode through the two wiring. In the display panel with a touch detection function disclosed in JP-A-2012-221485, the interconnection resistance in the selection switch may influence a time constant of a waveform of the drive signal. The selection switch, thus, needs to be enlarged in order to reduce the interconnection resistance thereof. The increase in the size of the selection switch may enlarge the frame area, which does not contribute to function as a display area.

For the foregoing reasons, there is a need for a display device with a touch detection function and an electronic apparatus capable of reducing the interconnection resistance of the selection switch that selects a drive electrode to which the drive signal is applied and capable of reducing the frame in size.

SUMMARY

According to an aspect, a display device with a touch detection function includes: a display area including a plurality of pixel electrodes arranged in a matrix on a substrate; a plurality of drive electrodes that are disposed to face the plurality of pixel electrodes; a display function layer that has an image display function to display an image in the display area; a controller that performs image display control to fulfill the image display function of the display function layer by applying a display drive voltage between the plurality of pixel electrodes and the plurality of drive electrodes based on an image signal; a plurality of touch detection electrodes that face the plurality of drive electrodes, and form an electrostatic capacitance between the plurality of drive electrodes and the plurality of touch detection electrodes; a touch detection unit that detects a position of an approaching object based on a detection signal from the plurality of touch detection electrodes; touch wiring that is routed in a frame area located outside the display area and supplies a touch drive signal to the plurality of drive electrodes; and a plurality of switch groups that are provided for each of the plurality of drive electrodes, each of the plurality of switch groups having a plurality of selection switches that operate based on a selection signal from the controller. The plurality of switch groups select a drive electrode to be coupled to the touch wiring from the plurality of drive electrodes based on a selection signal from the controller, and the plurality of selection switches for each of the plurality of switch groups are coupled in parallel with each other between a corresponding drive electrode and the touch wiring, and for each of the plurality of drive electrodes, all of the plurality of selection switches operate in accordance with the selection signal, couple the corresponding drive electrodes and the touch wiring, and apply the touch drive signal to the corresponding drive electrodes.

According to another aspect, an electronic apparatus has a display device with a touch detection function capable of detecting an externally approaching object. The display device with a touch detection function includes: a display area including a plurality of pixel electrodes arranged in a matrix on a substrate; a plurality of drive electrodes that are disposed to face the plurality of pixel electrodes; a display function layer that has an image display function to display an image in the display area; a controller that performs image display control to fulfill the image display function of the display function layer by applying a display drive voltage between the plurality of pixel electrodes and the plurality of drive electrodes based on an image signal; a plurality of touch detection electrodes that face the plurality of drive electrodes, and form an electrostatic capacitance between the plurality of drive electrodes and the plurality of touch detection electrodes; a touch detection unit that detects a position of an approaching object based on a detection signal from the plurality of touch detection electrodes; touch wiring that is routed in a frame area located outside the display area and supplies a touch drive signal to the plurality of drive electrodes; and a plurality of switch groups that are provided for each of the plurality of drive electrodes, each of the plurality of switch groups having a plurality of selection switches that operate based on a selection signal from the controller. The plurality of switch groups select a drive electrode to be coupled to the touch wiring from the plurality of drive electrodes based on a selection signal from the controller, and the plurality of selection switches for each of the plurality of switch groups are coupled in parallel with each other between a corresponding drive electrode and the touch wiring, and for each of the plurality of drive electrodes, all of the plurality of selection switches operate in accordance with the selection signal, couple the corresponding drive electrodes and the touch wiring, and apply the touch drive signal to the corresponding drive electrodes.

Additional features and advantages are described herein, and will be apparent from the following Detailed Description and the figures.

DETAILED DESCRIPTION

Embodiments of the present disclosure are described below in detail with reference to the accompanying drawings. The description of the following embodiments does not limit the present disclosure. The constituent elements of the following embodiments include elements easily envisaged by those skilled in the art and identical elements. The constitute elements described below can also be combined as appropriate. The description will be made in the following order.

1. Embodiments (display device with a touch detection function)
1-1. First Embodiment
1-2. Second Embodiment
1-3. Third Embodiment
2. Application Examples (electronic apparatuses)

Figure 1:
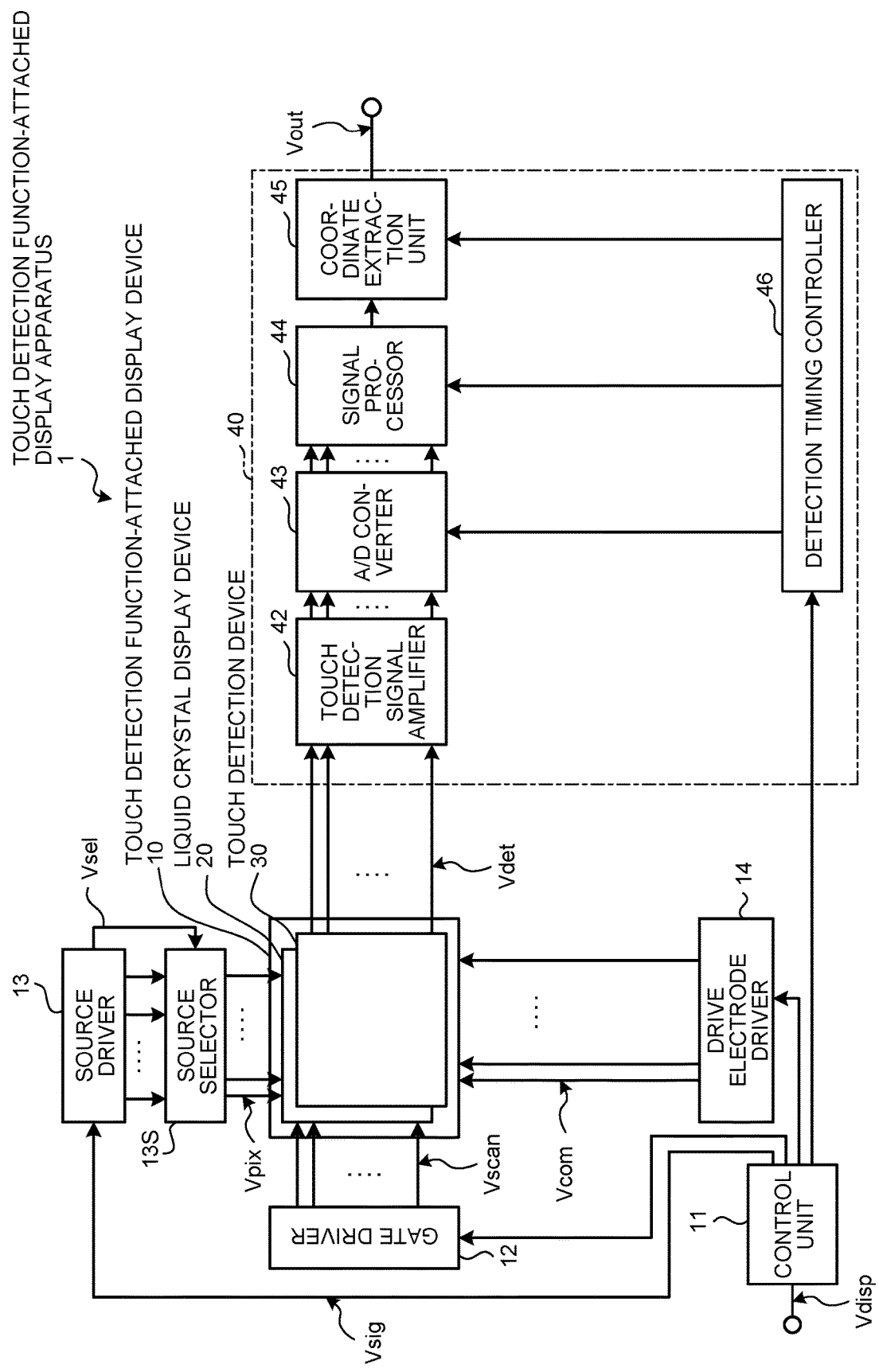
FIG. 1 is a block diagram illustrating an example of the configuration of a display device with a touch detection function according to a first embodiment.

Examples in which the display device with a touch detection function according to the embodiments mentioned above are applied to electronic apparatuses 3. Aspects of the Present Disclosure
1. Embodiments
1-1. First Embodiment
1-1A. Configuration Example
Overall Configuration Example FIG. 1 is a block diagram illustrating an example of the configuration of a display device with a touch detection function according to a first embodiment. A display device with a touch detection function 1 includes a display unit with a touch detection function 10, a control unit 11, a gate driver 12, a source driver 13, a source selector 13S, a drive electrode driver 14, and a touch detection unit 40. In the display device with a touch detection function 1, the display unit with a touch detection function 10 is a display device having a touch detection function built therein. The display unit with a touch detection function 10 is an in-cell type device in which a liquid crystal display unit 20 using a liquid crystal element as a display element and an electrostatic capacitance type touch detection device 30 are integrated. The display unit with a touch detection function 10 may be an on-cell type device in which the electrostatic capacitance type touch detection device 30 is attached onto the liquid crystal display unit 20 using the liquid crystal element as the display element.

The liquid crystal display unit 20 performs display by sequentially scanning each one horizontal line in accordance with a scan signal Vscan supplied from the gate driver 12, which is described later. The control unit 11 supplies control signals to the gate driver 12, the source driver 13, the drive electrode driver 14, and the touch detection unit 40 based on a video signal Vdisp externally supplied so as to control the gate driver 12, the source driver 13, the drive electrode driver 14, and the touch detection unit 40 to operate in synchronization with each other. The controller in the present disclosure includes the control unit 11, the gate driver 12, the source driver 13, and the drive electrode driver 14.

The gate driver 12 has a function of sequentially selecting one horizontal line as a target of display driving of the display unit with a touch detection function 10, based on the control signal supplied from the control unit 11.

The source driver 13 is a circuit that supplies a pixel signal Vpix to each pixel Pix (sub-pixel SPix), which is described later, of the display unit with a touch detection function 10 based on the control signal supplied from the control unit 11. The source driver 13 generates an image signal in which the pixel signals Vpix of a plurality of sub-pixels SPix of the liquid display unit 20 are time-division multiplexed from the video signal Vdisp for one horizontal line, and supplies the generated image signal to the source selector 13S, which is described later. The source driver 13 also generates a switch control signal Vsel necessary to separate the pixel signals Vpix multiplexed in an image signal Vsig from the image signal Vsig, and supplies the switch control signal Vsel to the source selector 13S together with the pixel signals Vpix. The source selector 13S can reduce the number of wiring between the source driver 13 and the control unit 11.

The drive electrode driver 14 is a circuit that supplies a drive signal VcomAC for touch detection (touch drive signal, hereinafter referred to as the drive signal) and a display drive voltage VcomDC serving as a voltage for displaying to a drive electrode COML, which is described later, of the display unit with a touch detection function 10 based on the control signal supplied from the control unit 11.

The touch detection unit 40 is a circuit that detects existence of a touch (the touch conditions described below) on the touch detection device 30 based on the control signal supplied from the control unit 11 and a touch detection signal Vdet supplied from the touch detection device 30 of the display unit with a touch detection function 10, and obtains the coordinates of the touch in a touch detected area when the touch exists. The touch detection unit 40 includes a touch detection signal amplifier 42, an analog-digital (A/D) converter 43, a signal processor 44, a coordinate extraction unit 45, and a detection timing controller 46.

The touch detection signal amplifier 42 amplifies the touch detection signal Vdet supplied from the touch detection device 30. The touch detection signal amplifier 42 may include a low pass analog filter that removes a high frequency component (noise component) included in the touch detection signal Vdet and extracts touch components and outputs the touch components.

Basic Principle of Electrostatic Capacitance Type Touch Detection

Figure 2:
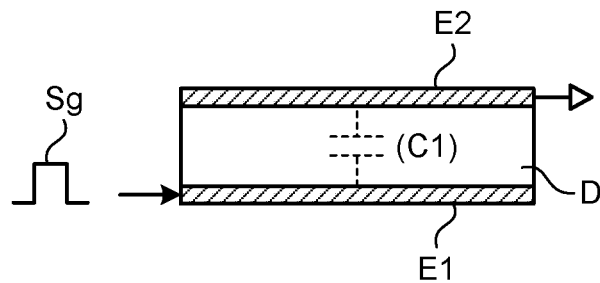
FIG. 2 is a diagram to explain a basic principle of an electrostatic capacitance type touch detection method and a state where a finger does not come into contact with or approaches a device.
Figure 3:
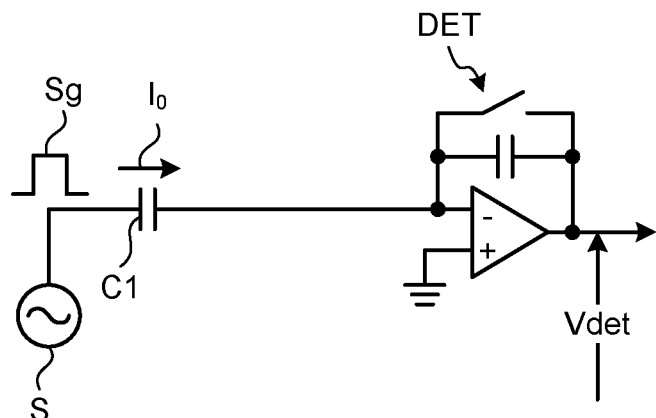
FIG. 3 is an explanatory diagram illustrating an example of an equivalent circuit of the state illustrated in FIG. 2.
Figure 4:
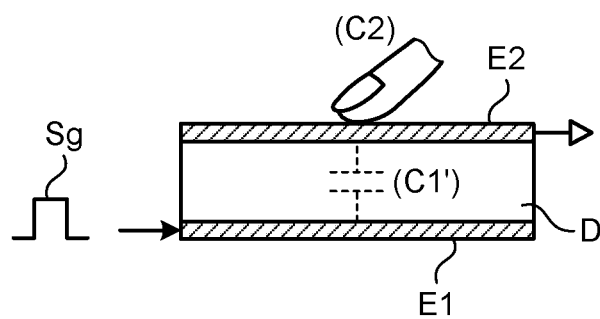
FIG. 4 is a diagram to explain the basic principle of the electrostatic capacitance type touch detection method and a state where a finger comes into contact with or approaches a device.
Figure 5:
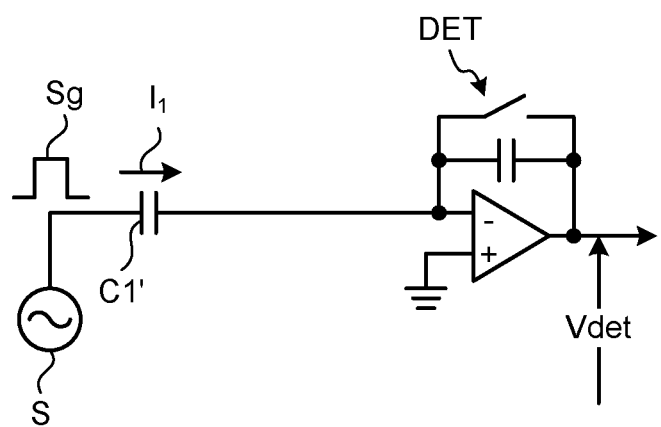
FIG. 5 is an explanatory diagram illustrating an example of an equivalent circuit of the state illustrated in FIG. 4.
Figure 6:
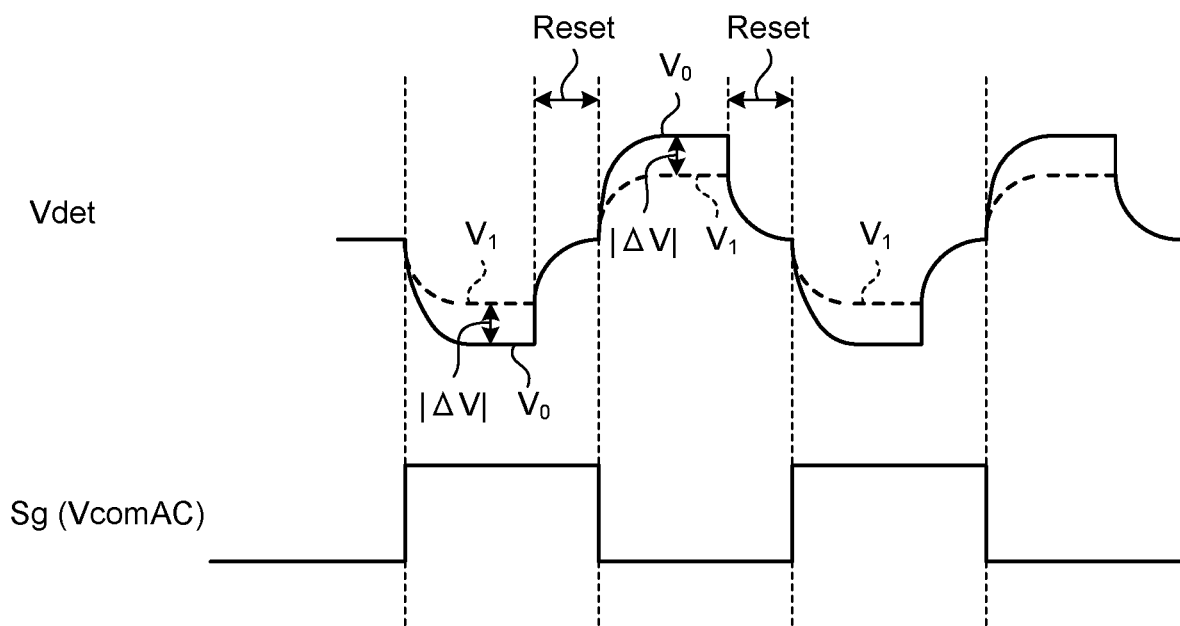
FIG. 6 is a schematic diagram illustrating an example of waveforms of a drive signal and a touch detection signal.

The touch detection device 30 operates based on the basic principle of electrostatic capacitance type touch detection and outputs the touch detection signal Vdet. The following describes the basic principle of touch detection in the display device with a touch detection function 1 of the embodiment with reference to FIGS. 1 to 6. FIG. 2 is a diagram to explain a basic principle of an electrostatic capacitance type touch detection method and a state where a finger does not come into contact with or approach a device. FIG. 3 is an explanatory diagram illustrating an example of an equivalent circuit of the state illustrated in FIG. 2. FIG. 4 is a diagram to explain the basic principle of the electrostatic capacitance type touch detection method and a state where a finger comes into contact with or approaches a device. FIG. 5 is an explanatory diagram illustrating an example of the equivalent circuit of the state illustrated in FIG. 4. FIG. 6 is a schematic diagram illustrating an example of waveforms of the drive signal and the touch detection signal.

As illustrated in FIG. 2, a capacitive element C1 includes a pair of electrodes of a drive electrode E1 and a touch detection electrode E2, which are disposed to face each other with a dielectric substance D interposed therebetween, for example. As illustrated in FIG. 3, the one end of the capacitive element C1 is coupled to an alternating-current (AC) signal source (drive signal source) S and the other end thereof is coupled to a voltage detector (touch detection unit) DET. The voltage detector DET is an integrating circuit included in the touch detection signal amplifier 42 illustrated in FIG. 1, for example.

When an alternating-current (AC) rectangular wave Sg having a predetermined frequency (e.g., from about several to several hundred kilohertz) is applied to the drive electrode E1 (the one end of the capacitive element C1) from the AC signal source S, an output waveform (the touch detection signal Vdet) appears through the voltage detector DET coupled on a side adjacent to the touch detection electrode E2 (the other end of the capacitive element C1). The AC rectangular wave Sg corresponds to the drive signal VcomAC, which is described later.

In the state where a finger does not come into contact with (or approach) a device (non-contact state), as illustrated in FIGS. 2 and 3, a current $I_0$ flows in accordance with a capacitance value of the capacitive element C1 during the charging and discharging of the capacitive element C1. The voltage detector DET illustrated in FIG. 3 converts a change in current $I_0$ according to the AC rectangular wave Sg into a change in voltage (a waveform $V_0$ illustrated with the actual line in FIG. 6).

In the state where a finger comes into contact with (or approaches) a display (contact state), as illustrated in FIG. 4, the electrostatic capacitance acts as a capacitive element C1' having a smaller capacitance value than that of the capacitive element C1 because a fringe component of the electrostatic capacitance between the drive electrode E1 and the touch detection electrode E2 is blocked due to an electrostatic capacitance C2, which is formed by the finger, comes into contact with or exists near the touch detection electrode E2. As illustrated in the equivalent circuit in FIG. 5, a current $I_1$ flows in the capacitive element C1'. As illustrated in FIG. 6, the voltage detector DET converts a change in current $I_1$ according to the AC rectangular wave Sg into a change in voltage (a waveform $V_1$ illustrated with the dotted line). In this case, the amplitude of the waveform $V_1$ is smaller than that of the waveform $V_0$. The absolute value $|\Delta V|$ of a difference in voltage between the waveform $V_0$ and the waveform $V_1$ changes in accordance with the influence of an externally approaching object such as a finger. The voltage detector DET preferably operates with a time period of Reset in which the charging and discharging of the capacitor is reset by switching in the circuit in synchronization with the frequency of the AC rectangular wave Sg so as to accurately detect the absolute value $|\Delta V|$ of a difference in voltage between the waveform $V_0$ and the waveform $V_1$.

The touch detection device 30 illustrated in FIG. 1 performs touch detection by sequentially scanning each one detection block in accordance with a drive signal Vcom (the drive signal VcomAC, which is described later) supplied from the drive electrode driver 14.

The touch detection device 30 outputs the touch detection signal Vdet from a plurality of touch detection electrodes TDL to be described later for each detection block through the voltage detector DET illustrated in FIG. 3 or 5, and thereby supplying the touch detection signal Vdet to the A/D converter 43 of the touch detection unit 40.

The A/D converter 43 is a circuit that samples respective analog signals output from the touch detection signal amplifier 42 and converts the analog signals into digital signals in synchronization with the drive signal VcomAC.

The signal processor 44 includes a digital filter that reduces a frequency component (noise component), which excludes the sampling frequency of the drive signal VcomAC, included in the output signals from the A/D converter 43. The signal processor 44 is a logic circuit that detects the existence of a touch on the touch detection device 30 based on the output signals from the A/D converter 43. The signal processor 44 only extracts the voltage difference caused by a finger. The voltage difference caused by a finger is the absolute value $|\Delta V|$ of the voltage difference between the waveform $V_0$ and the waveform $V_1$. The signal processor 44 may perform an arithmetic operation to average the absolute values $|\Delta V|$ per detection block and obtain the average of the absolute values $|\Delta V|$. As a result, the signal processor 44 can reduce the influence due to noise. The signal processor 44 compares the detected voltage difference caused by a finger with a predetermined threshold voltage and determines that it is in the contact state with an externally approaching object when the voltage difference is equal to or larger than the threshold voltage. The signal processor 44 determines that it is in the non-contact state with an external approaching object when the voltage difference is smaller than the threshold voltage. In this way, the touch detection unit 40 can perform the touch detection.

The coordinate extraction unit 45 is a logic circuit that obtains touch panel coordinates of the touch when the touch is detected by the signal processor 44. The detection timing controller 46 controls the A/D converter 43, the signal processor 44, and the coordinate extraction unit 45 to be operated in synchronization with each other. The coordinate extraction unit 45 outputs the touch panel coordinates as a signal output Vout.

Module

Figure 7:
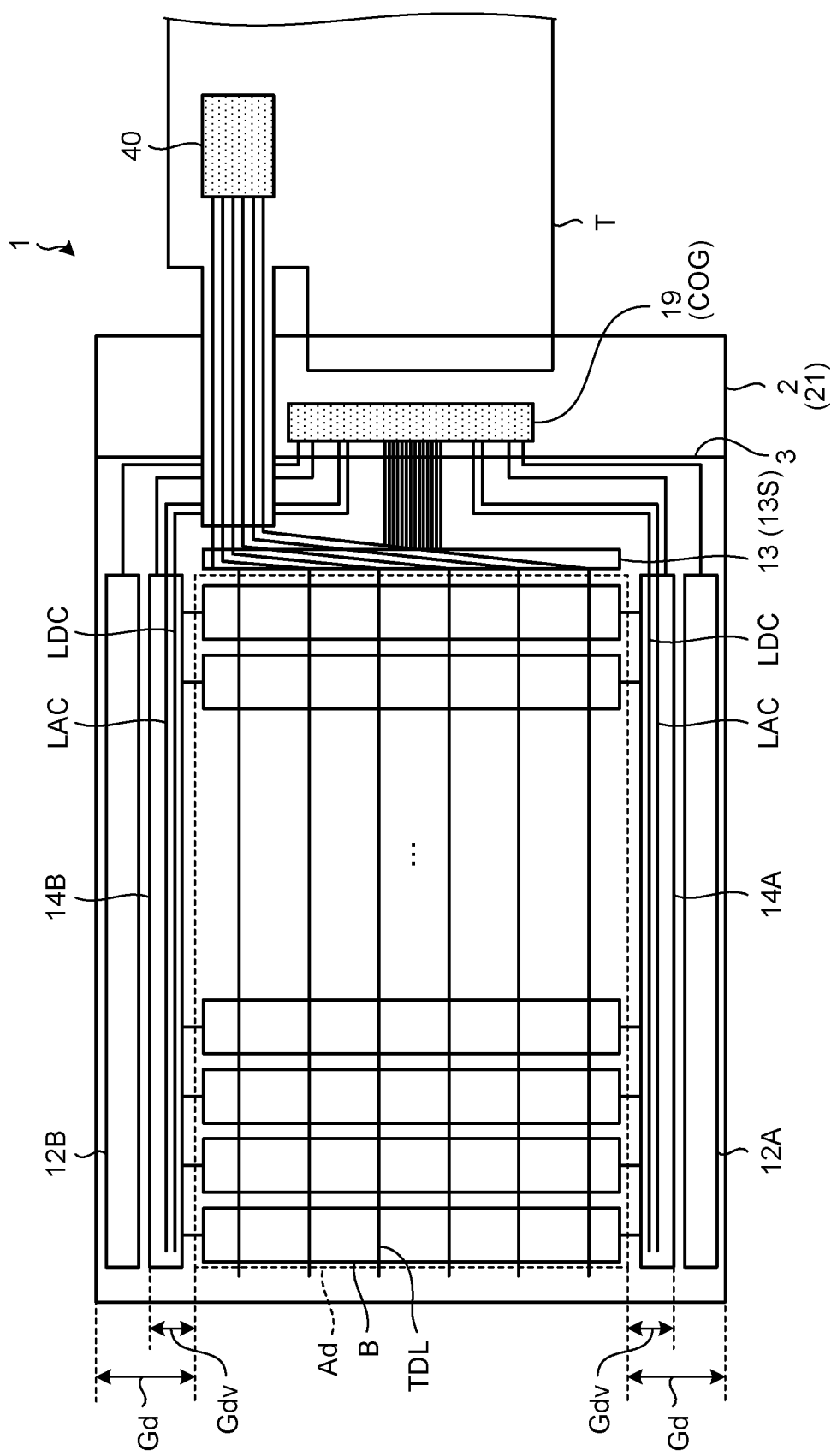
FIG. 7 is a schematic diagram illustrating an example of a module on which the display device with a touch detection function according to the first embodiment is mounted.

FIG. 7 is a schematic diagram illustrating an example of a module on which the display device with a touch detection function according to the first embodiment is mounted. As illustrated in FIG. 7, the display device with a touch detection function 1 includes a pixel substrate 2 (a thin film transistor (TFT) substrate 21), which is described later, and a flexible printed circuit substrate T. The pixel substrate 2 (TFT substrate 21) has a chip on glass (COG) 19 mounted thereon and a display area Ad of the liquid crystal display unit and frames Gd formed thereon. The COG 19 is an integrated circuit (IC) driver chip mounted on the TFT substrate 21 and is a controller that includes the circuits necessary for display operation, such as the control unit 11 and the source driver 13 illustrated in FIG. 1. In the embodiment, the source driver 13 and the source selector 13S are formed on the TFT substrate 21. The source driver 13 and the source selector 13S may be built into the COG 19. Drive electrode scan units 14A and 14B, which are included in the drive electrode driver 14, are formed on the TFT substrate 21. The gate driver 12 is formed on the TFT substrate 21 as gate drivers 12A and 12B. The display device with a touch detection function 1 may build the circuits such as the drive electrode scan units 14A and 14B and the gate driver 12 into the COG 19.

As illustrated in FIG. 7, drive electrode blocks B composed of the drive electrode COML and the touch detection electrodes TDL are formed such that they intersect with each other in a grade separation manner in a direction perpendicular to the surface of the TFT substrate 21.

The drive electrodes COML is a plurality of stripe electrode patterns extending in one direction. In the touch detection operation, the drive signal VcomAC is sequentially applied to the respective electrode patterns by the drive electrode driver 14. The drive electrode block B illustrated in FIG. 7 is the plurality of stripe electrode patterns of the drive electrodes COML, to which patterns the drive signal VcomAC is supplied in parallel. The drive electrode blocks B (drive electrodes COML) are formed in the long side direction of the display unit with a touch detection function 10, whereas the touch detection electrodes TDL, which are described later, are formed in the short side direction of the display unit with a touch detection function 10. The output ends of the touch detection electrodes TDL are coupled to the touch detection unit 40, which is mounted on the flexible printed circuit substrate T and provided on the short side of the display unit with a touch detection function 10, through the flexible printed circuit substrate T. In this way, the touch detection unit 40 is mounted on the flexible printed circuit substrate T and coupled to the respective touch detection electrodes TDL arranged in parallel with each other. The flexible printed circuit substrate T is only required to function as a terminal and thus is not limited to the flexible printed circuit substrate. When such a terminal is used, the touch detection unit 40 is provided outside the module.

A drive signal generator, which is described later, is built into the COG 19. The source selector 13S is formed using TFT elements in the vicinity of the display area Ad on the TFT substrate 21. In the display area Ad, a large number of pixels Pix, which are described later, are arranged in a matrix (in rows and columns). The frames Gd are areas in which no pixels Pix are arranged when viewed from the direction perpendicular to the surface of the TFT substrate 21. The gate driver 12 and drive electrode scan units 14A and 14B included in the drive driver 14 are arranged in the frames Gd.

The gate driver 12, which includes the gate drivers 12A and 12B, is formed on the TFT substrate 21 using TFT elements. The gate drivers 12A and 12B can drive the sub-pixels SPix (pixels), which are described later, arranged in a matrix in the display area Ad from both sides of the display area Ad interposed therebetween. In the following description, the gate driver 12A is referred to as a first gate driver 12A while the gate driver 12B is referred to as a second gate driver 12B. Scan lines GCL, which are described later, are arranged between the first gate driver 12A and the second gate driver 12B. Thus, the scan lines GCL are provided, in the direction perpendicular to the surface of the TFT substrate 21 (on-above the TFT substrate 21), such that they extend in a direction in parallel with the extending direction of the drive electrode COML.

The drive electrode scan units 14A and 14B are formed on the TFT substrate 21 using TFT elements. The drive electrode scan units 14A and 14B each receive the display drive voltage VcomDC through display wiring LDC and the drive signal VcomAC through touch wiring LAC from the drive signal generator. The drive electrode scan units 14A and 14B each occupy a predetermined width Gdv in the frame Gd. The drive electrode scan units 14A and 14B can drive the respective drive electrode blocks B arranged in parallel with each other from both sides of the respective drive electrode blocks B. The display wiring LDC supplying the display drive voltage VcomDC and the touch wiring LAC supplying the touch drive signal VcomAC are arranged in parallel with each other in each frame Gd. The display wiring LDC is disposed on a side closer to the display area Ad than the touch wiring LAC. This arrangement causes the display drive voltage VcomDC supplied by the display wiring LDC to stabilize a potential condition at the end portion of the display area Ad. As a result, in particular, a liquid crystal display device using a liquid crystal of a lateral electric field mode performs a stable display.

The display device with a touch detection function 1 illustrated in FIG. 7 outputs the touch detection signal Vdet from a side adjacent to the short side of the display unit with a touch detection function 10. As a result, the display device with a touch detection function 1 makes it possible to readily route the wiring when the display unit with a touch detection function 10 is coupled to the touch detection unit 40 through the flexible printed circuit substrate T serving as the terminal unit.

Display Device With a Touch Detection Function

Figure 8:
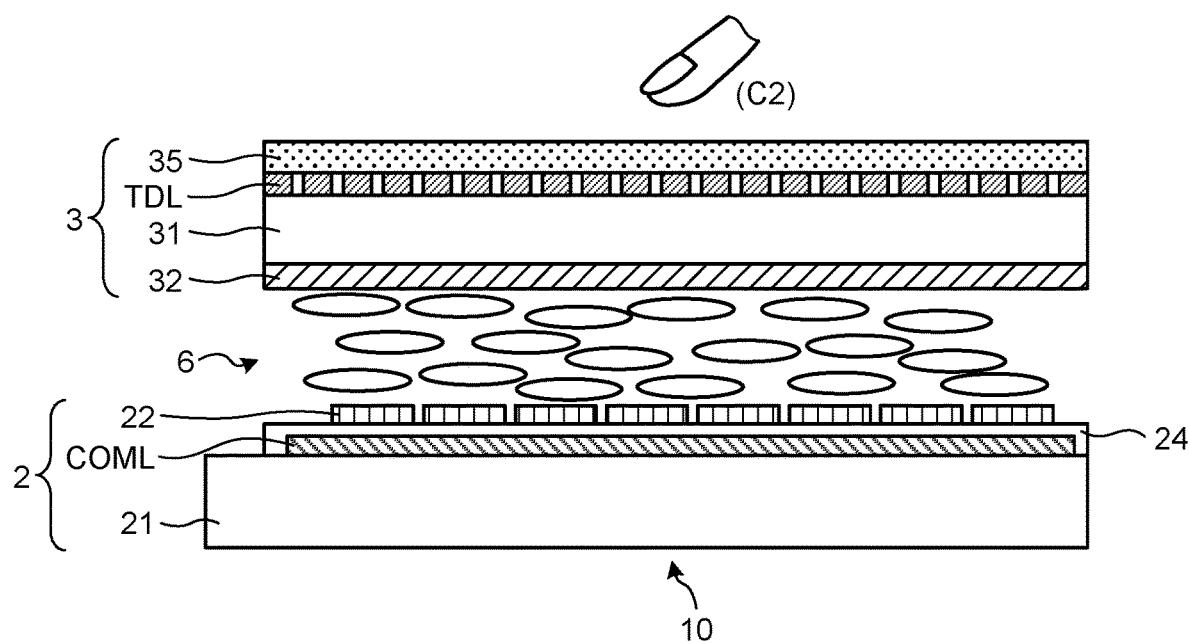
FIG. 8 is a cross-sectional diagram illustrating a schematic cross-sectional structure of a display unit with a touch detection function according to the first embodiment.
Figure 9:
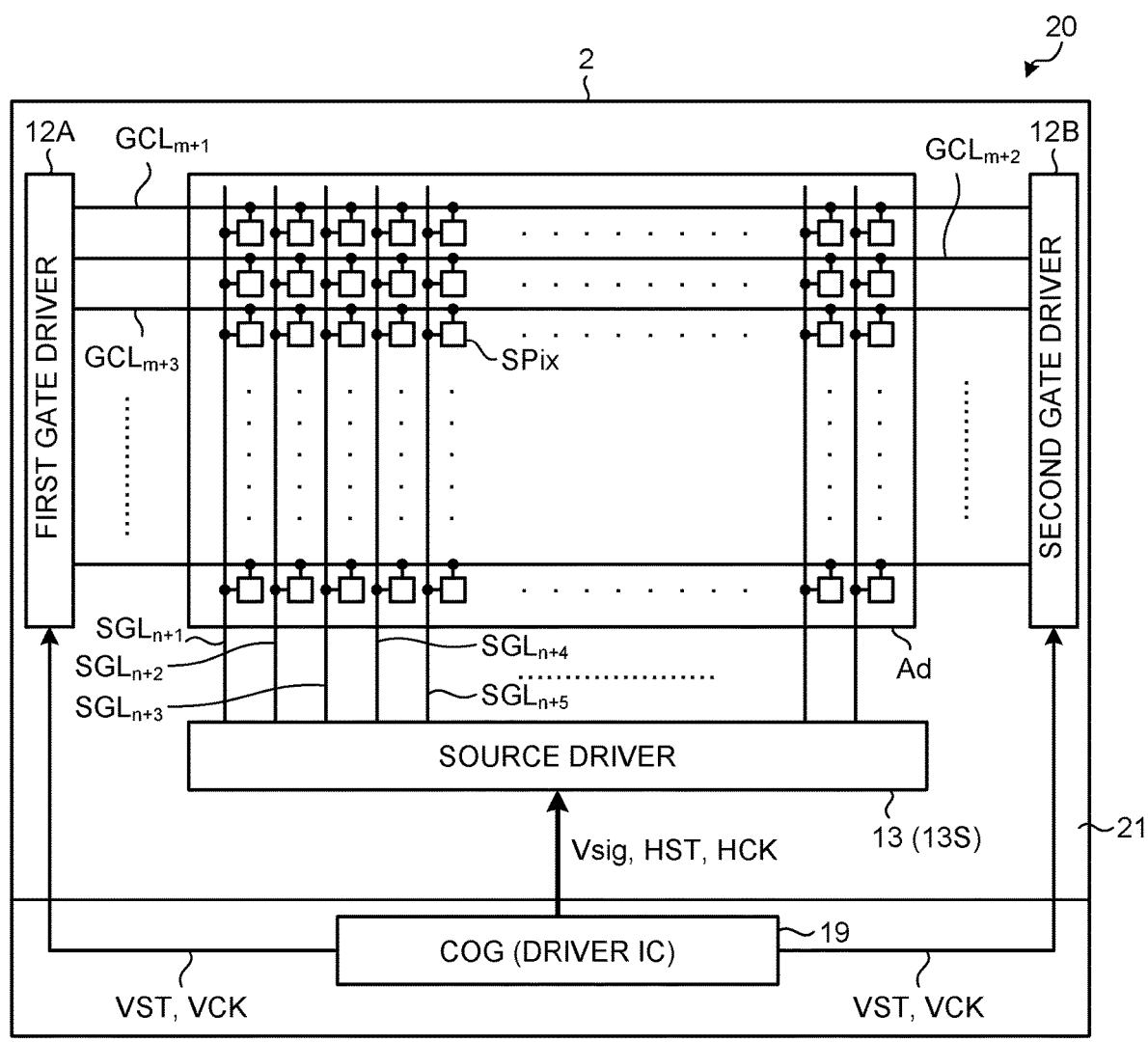
FIG. 9 is a schematic diagram illustrating an example of a controller of the display device with a touch detection function according to the first embodiment.
Figure 10:
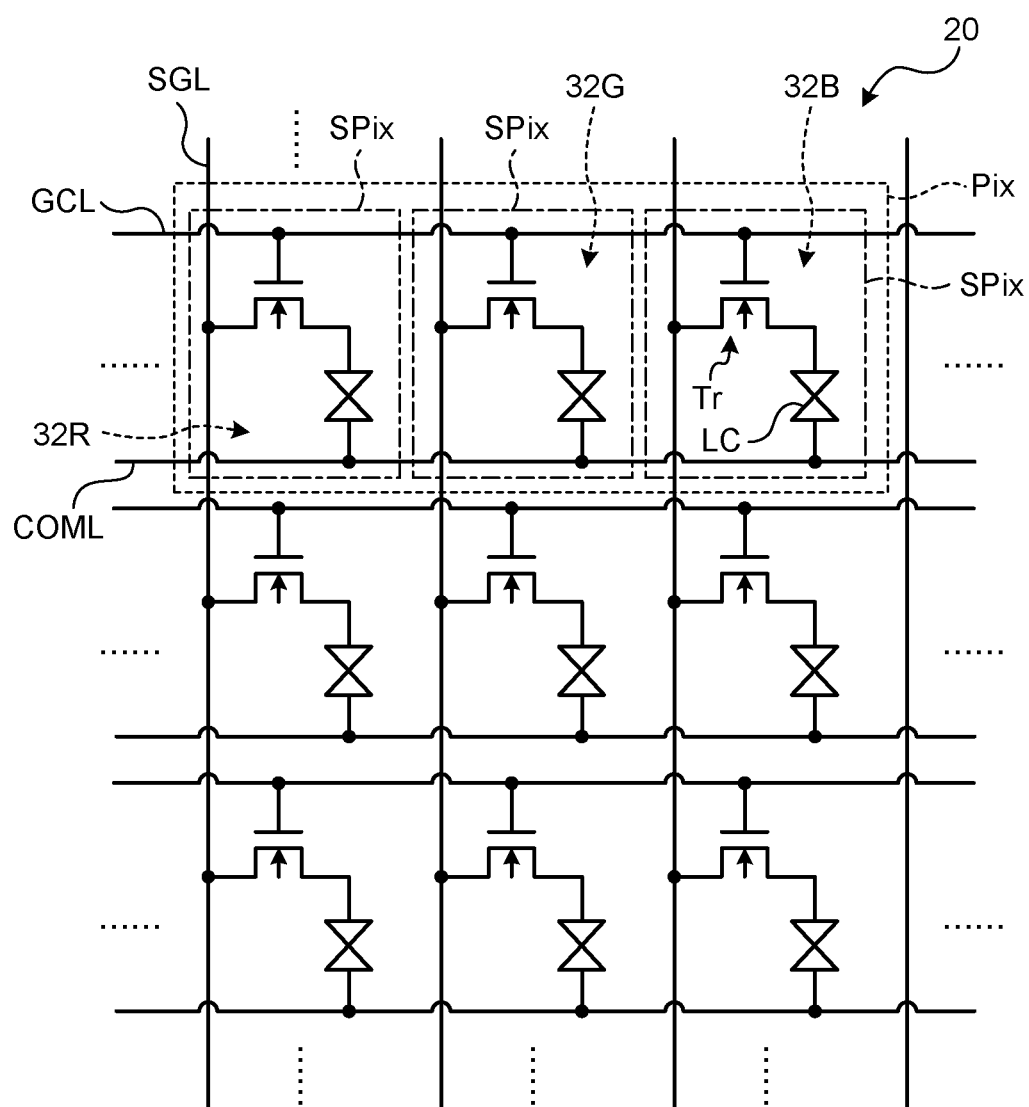
FIG. 10 is a circuit diagram illustrating a pixel arrangement of the display unit with a touch detection function according to the first embodiment.

The following describes a configuration example of the display unit with a touch detection function 10 in detail. FIG. 8 is a cross-sectional diagram illustrating a schematic cross-sectional structure of the display unit with a touch detection function according to the first embodiment. FIG. 9 is a schematic diagram illustrating an example of the controller of the display device with a touch detection function according to the first embodiment. FIG. 10 is a circuit diagram illustrating a pixel arrangement of the display unit with a touch detection function according to the first embodiment.

As illustrated in FIG. 8, the display unit with a touch detection function 10 includes the pixel substrate 2, a counter substrate 3 disposed to face the pixel substrate 2 in the direction perpendicular to the surface of the pixel substrate 2, and a liquid crystal layer 6 interposed between the pixel substrate 2 and the counter substrate 3.

The liquid crystal layer 6 modulates light passing through the liquid crystal layer 6 in accordance with the state of an electric field. A liquid crystal of a lateral electric field mode such as a fringe field switching (FFS) or an in-plane switching (IPS) mode is used for the liquid crystal display device, for example. Alignment films may be disposed between the liquid crystal layer 6 and the pixel substrate 2 and between the liquid crystal layer 6 and the counter substrate 3 in FIG. 8.

The counter substrate 3 includes a glass substrate 31 and a color filter 32 formed on the one surface of the glass substrate 31. On the other surface of the glass substrate 31, the touch detection electrodes TDL serving as the detection electrodes of the touch detection device 30 are formed. In addition, a polarizing plate 35 is disposed on the touch detection electrodes TDL.

The pixel substrate 2 includes the TFT substrate 21 as a circuit substrate, a plurality of pixel electrodes 22 arranged in a matrix on the TFT substrate 21, the a plurality of drive electrodes COML formed between the TFT substrate 21 and the pixel electrodes 22, and an insulation layer 24 that isolates the pixel electrodes 22 and the drive electrodes COML.

System Configuration Example of Display Apparatus

The pixel substrate 2 includes the display area Ad, the COG 19 having functions of an interface (I/F) and a timing generator, the first gate driver 12A, the second gate driver 12B, and the source driver 13 on the TFT substrate 21. The flexible printed circuit substrate T illustrated in FIG. 7 transmits external signals or drive power driving the COG 19 to the COG 19 illustrated in FIGS. 7 and 9. The pixel substrate 2 includes, at the surface of the TFT substrate 21 of a transparent insulation substrate (e.g., a glass substrate), the display area Ad in which a large number of pixels including liquid crystal cells are arranged in a matrix (rows and columns), the source driver (horizontal drive circuit) 13, and the gate drivers (vertical drive circuits) 12A and 12B. The gate drivers (vertical drive circuits) 12A and 12B are arranged as the first gate driver 12A and the second gate driver 12B with the display area Ad interposed therebetween.

The display area Ad has a matrix (row-column) structure in which the sub-pixels SPix including liquid crystal layers are arranged in m rows×n columns. In this specification, the term row means the pixel row having m sub-pixels SPix arranged in one direction. The term column means the pixel column including n sub-pixels SPix arranged in a direction perpendicular to the extending direction of the pixel row. The values of m and n are determined in accordance with a display resolution in the vertical direction and the display resolution in the horizontal direction. In the display area Ad, scan lines $GCL_{m+1}$, $GCL_{m+2}$, $GCL_{m+3}$, and so on are wired for the respective rows and signal lines $SGL_{n+1}$, $SGL_{n+2}$, $SGL_{n+3}$, $SGL_{n+4}$, $SGL_{n+5}$, and so on are wired for the respective columns in the m-row, n-column matrix of the pixels Vpix. In the embodiment, the scan lines $GCL_{m+1}$, $GCL_{m+2}$, $GCL_{m+3}$, and so on may be collectively described as the scan line GCL while the signal lines $SGL_{n+1}$, $SGL_{n+2}$, $SGL_{n+3}$, $SGL_{n+4}$, $SGL_{n+5}$, and so on may be collectively described as the signal line SGL.

The pixel substrate 2 receives externally a master clock, a horizontal synchronizing signal, and a vertical synchronizing signal as external signals and they are applied to the COG 19. The COG 19 converts the amplitudes of the master clock, the horizontal synchronizing signal, and the vertical synchronizing signal that have the voltage amplitude of an external power source into the voltage amplitude of an internal power source necessary to drive the liquid crystal (performs level conversion or voltage boosting). Thereafter, the COG 19 inputs them to a timing generator as the master clock, the horizontal synchronizing signal, and the vertical synchronizing signal to generate a vertical start pulse VST, a vertical clock pulse VCK, a horizontal start pulse HST, and a horizontal clock pulse HCK. The COG 19 applies the vertical start pulse VST and the vertical clock pulse VCK to the first gate driver 12A and the second gate driver 12B, while applying the horizontal start pulse HST and the horizontal clock pulse HCK to the source driver 13. The COG 19 generates a display drive voltage (counter electrode potential) VCOM and applies it to the drive electrode COML. The display drive voltage VCOM is applied, in common, for the pixel electrodes of the respective sub-pixels SPix and is called common potential.

The first gate driver 12A and the second gate driver 12B include shift registers, which are described later, and may further include latch circuits. When the first gate driver 12A and the second gate driver 12B receive the vertical start pulse VST, the respective latch circuits sequentially sample and latch display data output from the COG 19 in one horizontal period in synchronization with the vertical clock pulse VCK. The first gate driver 12A and the second gate driver 12B sequentially output the digital data of one line latched by the latch circuit as a vertical scan pulse and apply the data to the scan line GCL, thereby sequentially selecting the sub-pixels SPix row by row. The first gate driver 12A and the second gate driver 12B are arranged with the scan line GCL interposed therebetween in the extending direction of the scan line GCL. The first gate driver 12A and the second gate driver 12B sequentially output the vertical scan pulse from the upper side of the display area Ad, that is the upper side in the vertical scan direction to the lower side of the display area Ad, that is the lower side in the vertical scan direction.

The digital image signal Vsig of 6-bit R (red) G (green) B (blue) is applied to the source driver 13, for example. The source driver 13 writes the display data into the respective sub-pixels SPix selected by the vertical scan of the first gate driver 12A and the second gate driver 12B for each pixel, pixels by pixels, or all pixels at once through the signal line SGL.

On the TFT substrate 21, formed are TFT elements Tr of the respective sub-pixels SPix illustrated in FIGS. 9 and 10, and the wiring such as the pixel signal line SGL supplying the pixel signal Vpix to the respective pixel electrodes 22 illustrated in FIG. 8, and the scan line GCL driving the respective TFT elements Tr. The pixel signal line SGL extends on the plane in parallel with the surface of the TFT substrate 21 and supplies the pixel signal Vpix to the pixels to display images. The liquid crystal display unit 20 illustrated in FIG. 10 includes the plurality of sub-pixels SPix arranged in a matrix. Each sub-pixel SPix includes the TFT element Tr and a liquid crystal element LC. The TFT element Tr is a thin film transistor. In this example, the TFT element Tr is an n-channel metal oxide semiconductor (MOS) type TFT. The source of the TFT element Tr is coupled to the pixel signal line SGL, the gate thereof is coupled to the scan line GCL, and the drain thereof is coupled to one end of the liquid crystal element LC. The one end of the liquid crystal element LC is coupled to the drain of the TFT element Tr and the other end thereof is coupled to the drive electrode COML.

The first gate driver 12A and the second gate driver 12B illustrated in FIG. 9 apply the vertical scan pulse to the gates of the TFT elements Tr of the respective sub-pixels SPix through the scan line GCL illustrated in FIG. 10 and thus sequentially select one row (one horizontal line) of the sub-pixels SPix arranged in a matrix in the display area Ad as the target of the display drive. The source driver 13 supplies, through the pixel signal line SGL, pixel signal Vpix to the respective sub-pixels SPix included in the horizontal line sequentially selected by the first gate driver 12A and the second gate driver 12B. The sub-pixels SPix serving as the display targets perform a display of one horizontal line in accordance with the supplied pixel signal. The drive electrode driver 14 drives the drive electrode COML by applying the display drive signal (display drive voltage VcomDC) thereto.

As described above, the display device with a touch detection function 1 drives the first gate driver 12A and the second gate driver 12B so as to sequentially scan the scan lines $GCL_{m+1}$, $GCL_{m+2}$, $GCL_{m+3}$, and so on, thereby sequentially selecting one horizontal line. In the display device with a touch detection function 1, the source driver 13 supplies the pixel signal to the respective pixels Vpix included in one horizontal line, thereby causing a display to be performed in units of one horizontal line. In the display operation, the drive electrode driver 14 applies the drive signal Vcom to the drive electrode COML corresponding to the horizontal line.

The color filter 32 illustrated in FIG. 8 is composed of color filters that are colored in the respective three colors of red (R), green (G), and blue (B) and periodically arranged, for example. A set of color areas 32R, 32G, and 32B of the three colors of RGB (refer to FIG. 10) provided to the respective sub-pixels SPix corresponds to the pixel Pix. The color filter 32 faces the liquid crystal layer 6 in the direction perpendicular to the TFT substrate 21. The combination of colors in the color filter 32 may differ from this example as long as different colors are combined.

The sub-pixels SPix illustrated in FIG. 10 are coupled to each other in the same row of the liquid crystal display unit 20 through the scan line GCL. The scan line GCL is coupled to the gate driver 12, which supplies the scan signal Vscan to the scan line GCL. The sub-pixels SPix are coupled to each other in the same column of the liquid crystal display unit 20 through the pixel signal line SGL. The pixel signal line SGL is coupled to the source driver 13, which supplies the pixel signal Vpix to the pixel signal line SGL.

Figure 11:
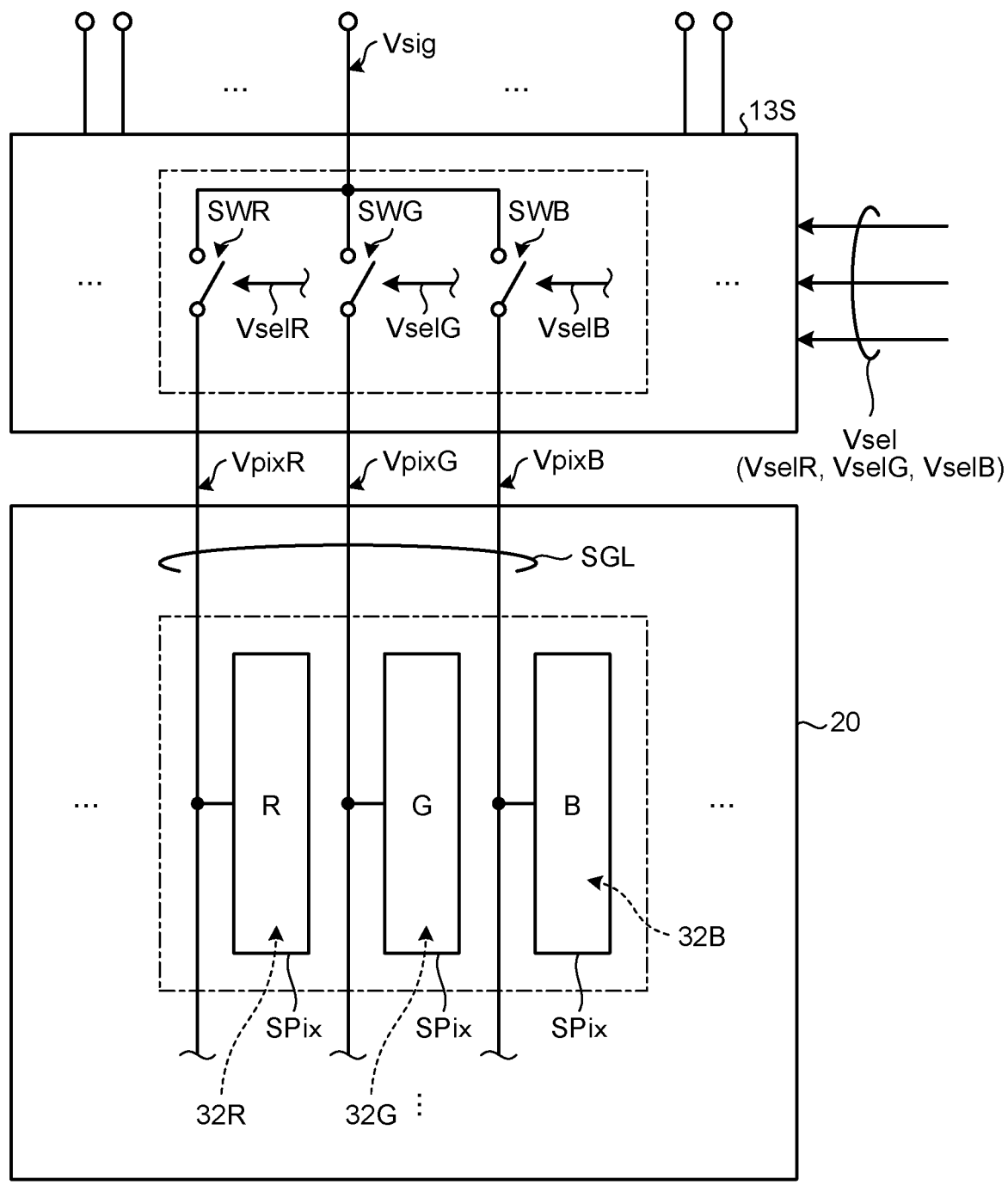
FIG. 11 is a schematic diagram to explain a relation between a source driver and a pixel signal line in the module on which the display device with a touch detection function according to the first embodiment is mounted.

FIG. 11 is a schematic diagram to explain a relation between the source driver and the pixel signal line in the module on which the display device with a touch detection function according to the first embodiment is mounted. As illustrated in FIG. 11, in the display device with a touch detection function 1, the pixel signal line SGL is coupled to the source driver 13 included in the COG 19 through the source selector 13S. The source selector 13S performs open-close operation in accordance with the switch control signal Vsel.

As illustrated in FIG. 11, the source driver 13 generates the pixel signal Vpix based on the image signal Vsig and the source driver control signal supplied from the control unit 11 and outputs the pixel signal Vpix. The source driver 13 generates the image signal in which the pixel signal Vpix for the sub-pixels SPix (in this case, three sub-pixels SPix) of the liquid crystal display unit 20 of the display unit with a touch detection function 10 are time-division multiplexed from the image signal Vsig for one horizontal line, and supplies the generated image signal to the source selector 13S. The source driver 13 also generates the switch control signal Vsel (VselR, VselG, and VselB) necessary to separate the pixel signal Vpix multiplexed in the image signal Vsig and supplies the switch control signal Vsel to the source selector 13S together with the image signal Vsig. The multiplexing reduces the number of wiring between the source driver 13 and the source selector 13S.

The source selector 13S separates, from the image signal Vsig, the pixel signal Vpix time-division multiplexed in the image signal Vsig based on the image signal Vsig and the switch control signal Vsel supplied from the source driver 13, and supplies the separated pixel signal Vpix to the liquid crystal display unit 20 of the display unit with a touch detection function 10.

The source selector 13S includes three switches SWR, SWG, and SWB, for example. The respective one ends of the switches SWR, SWG, and SWB are coupled to each other, through which the image signal Vsig is supplied from the source driver 13. The respective other ends of the switches SWR, SWG, and SWB are coupled to the respective corresponding sub-pixels SPix through the pixel signal line SGL of the liquid crystal display unit 20 of the display unit with a touch detection function 10. The switches SWR, SWG, and SWB are controlled to be opened or closed by the switch control signal Vsel (VselR, VselG, and VselB, respectively) supplied from the source driver 13. This configuration enables the source selector 13S to sequentially turn on the switches SWR, SWG, and SWB in a time-division multiplexing manner in accordance with the switch control signal Vsel. As a result, the source selector 13S separates, from the multiplexed image signal Vsig, the pixel signal Vpix (VpixR, VpixG, and VpixB). The source selector 13S then supplies the pixel signal Vpix to the respective three sub-pixels SPix. The color areas 32R, 32G, and 32B colored in red (R), green (G), and blue (B) correspond to the respective sub-pixels SPix. The pixel signal VpixR is supplied to the sub-pixel SPix corresponding to the color area 32R. The pixel signal VpixG is supplied to the sub-pixel SPix corresponding to the color area 32G. The pixel signal VpixB is supplied to the sub-pixel SPix corresponding to the color area 32B.

The sub-pixels SPix are coupled to each other in the same row of the liquid crystal display unit 20 through the drive electrode COML. The drive electrode COML is coupled to the drive electrode driver 14, which supplies the display drive voltage VcomDC to the drive electrode COML. In the embodiment, the multiple sub-pixels SPix included in the same row have the common drive electrode COML.

The gate driver 12 illustrated in FIG. 1 applies the scan signal Vscan to the gates of the TFT elements Tr of the respective sub-pixels SPix through the scan line GCL illustrated in FIG. 10, and thus sequentially selects one row (one horizontal line) of the sub-pixels SPix arranged in a matrix in the liquid crystal display unit 20 as the target of the display drive. The source driver 13 illustrated in FIG. 1 supplies the pixel signal Vpix to the respective sub-pixels SPix included in the horizontal line sequentially selected by the gate driver 12 through the pixel signal line SGL illustrated in FIG. 10. The sub-pixels SPix serving as the display drive targets perform a display of one horizontal line in accordance with the supplied pixel signal Vpix. The drive electrode driver 14 illustrated in FIG. 1 drives the drive electrode COM with the drive signal Vcom applied thereto for each drive electrode block B, which is illustrated in FIGS. 7 and 9, composed of a certain number of drive electrodes COML.

As described above, one horizontal line of the liquid crystal display unit 20 is sequentially selected in such a manner that the gate driver 12 sequentially scans the scan line GCL in a time-division multiplexing manner. The liquid crystal display unit 20 performs display in units of one display horizontal line in such a manner that the source driver 13 supplies the pixel signal Vpix to the respective sub-pixels SPix included in one horizontal line. In the display operation, the drive electrode driver 14 applies the display drive voltage VcomDC to the drive electrode block including the drive electrode COML corresponding to the horizontal line.

Figure 12:
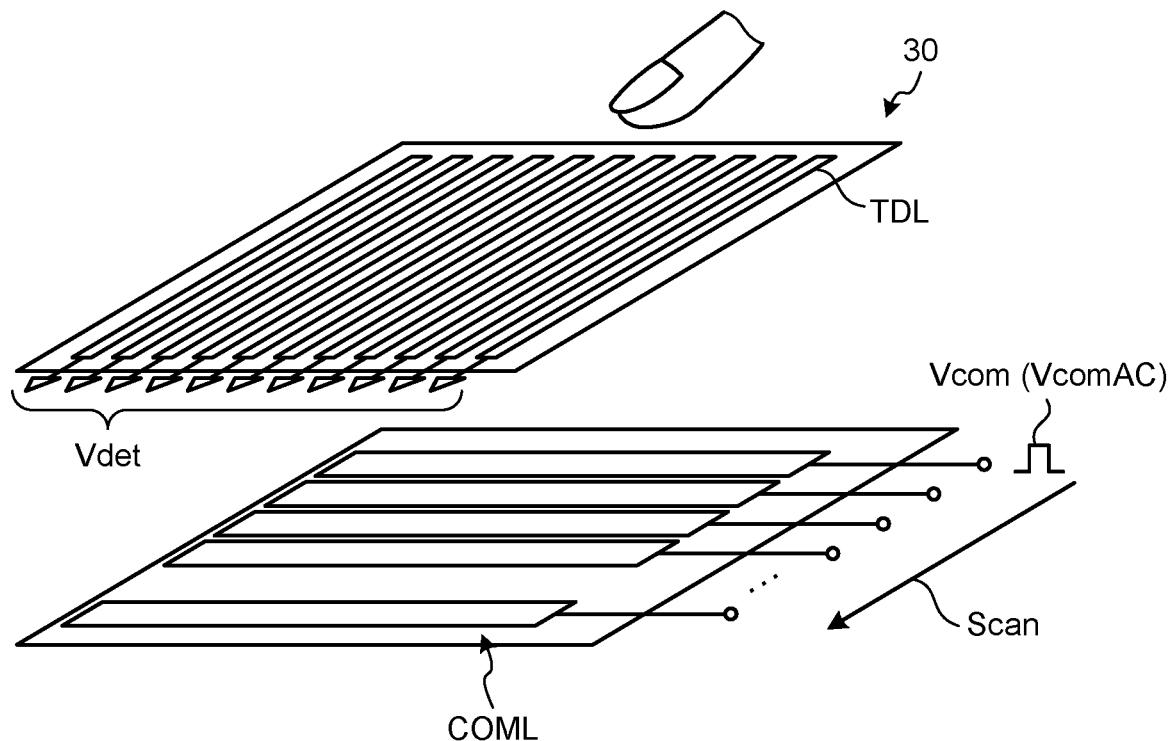
FIG. 12 is a perspective view illustrating an example of the configuration of drive electrodes and touch detection electrodes of the display unit with a touch detection function according to the first embodiment.

The drive electrodes COML according to the embodiment function as the drive electrodes of the liquid crystal display unit 20 and also function as the drive electrodes of the touch detection device 30. FIG. 12 is a perspective view illustrating an example of the configuration of the drive electrodes and the touch detection electrodes of the display unit with a touch detection function according to the first embodiment. The drive electrodes COML illustrated in FIG. 12 face the pixel electrodes 22 in the direction perpendicular to the surface of the TFT substrate 21 as illustrated in FIG. 8. The touch detection device 30 is composed of the drive electrodes COML provided on the pixel substrate 2 and the touch detection electrodes TDL provided on the counter substrate 3. The touch detection electrodes TDL are formed in a stripe electrode pattern extending in a direction intersecting with the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled to the respective corresponding inputs of the touch detection signal amplifier 42 of the touch detection unit 40. Electrostatic capacitances are generated between the drive electrodes COML and the touch detection electrodes TDL intersecting with each other at respective intersecting portions of the electrode patterns of the drive electrodes COML and the touch detection electrodes TDL. The shape of the touch detection electrodes TDL or the drive electrode COML (drive electrode block) is not limited to the stripe shape. The touch detection electrodes TDL or the drive electrodes COML (drive electrode blocks) may be formed in a comb-tooth shape. The touch detection electrodes TDL or the drive electrodes COML (drive electrode blocks) need to be separated from each other. The shape of the slits separating the drive electrodes COML may be a straight line or a curve.

In the touch detection device 30 thus configured, the drive electrode driver 14 drives the drive electrode blocks B illustrated in FIG. 7 such that they are line sequentially scanned in a time-division multiplexing manner when the touch detection operation is performed. As a result, each drive electrode block B (one detection block) composed of the drive electrodes COML is sequentially selected in a scan direction Scan. The touch detection device 30 outputs the touch detection signal Vdet from the touch detection electrodes TDL. In this way, the touch detection device 30 performs the touch detection on one detection block.

Figure 13:
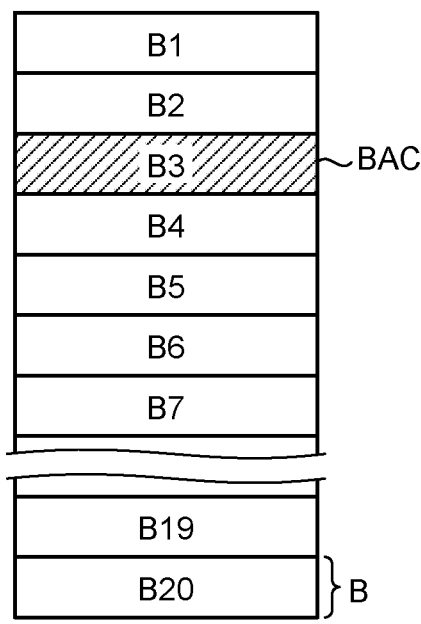
FIG. 13 is a schematic diagram illustrating an operation example of touch detection in the display device with a touch detection function according to the first embodiment.
Figure 14:
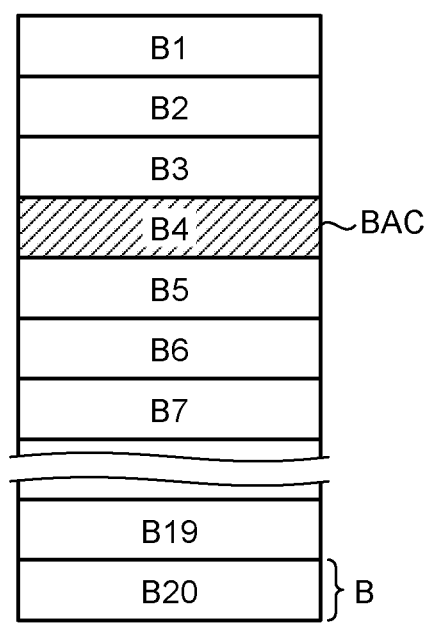
FIG. 14 is a schematic diagram illustrating the operation example of the touch detection in the display device with a touch detection function according to the first embodiment.
Figure 15:
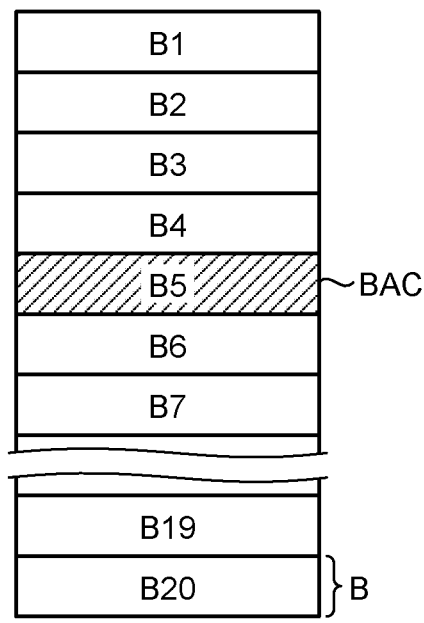
FIG. 15 is a schematic diagram illustrating the operation example of the touch detection in the display device with a touch detection function according to the first embodiment.
Figure 16:
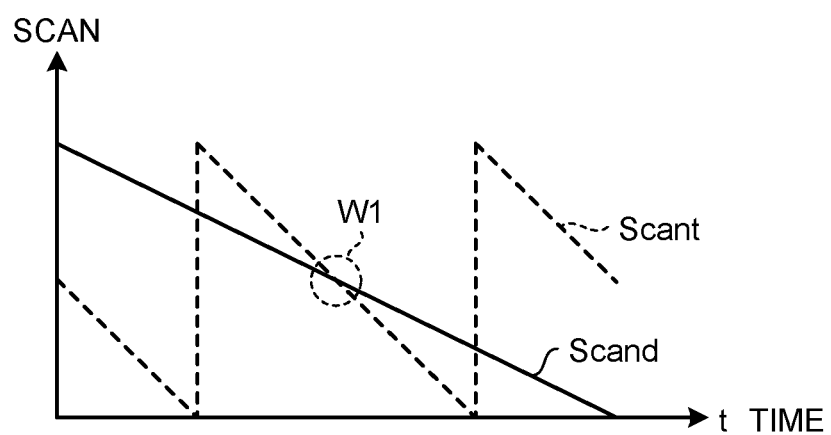
FIG. 16 is a schematic diagram to explain display operation and touch detection operation in the display device with a touch detection function according to the first embodiment.

FIGS. 13 to 15 are schematic diagrams illustrating an operation example of the touch detection in the display device with a touch detection function according to the first embodiment. FIG. 16 is a schematic diagram to explain the display operation and the touch detection operation in the display device with a touch detection function according to the first embodiment. In this case, the drive electrode blocks B composed of the drive electrodes COML illustrated in FIG. 7 are 20 drive electrode blocks of B1 to B20. FIGS. 13 to 15 illustrate operations to apply the touch drive signal VcomAC to the respective drive electrode blocks B1 to B20. A drive signal applied block BAC indicates the drive electrode block B to which the touch drive signal VcomAC is applied. No voltages are applied to the other drive electrode blocks B. The other drive electrode blocks B thus are in a state where potential is not fixed, called a floating state. The touch drive signal VcomAC is applied to the drive signal applied block BAC and the display drive voltage VcomDC may be applied to the other drive electrode blocks B and thus the potential of the other drive electrode blocks B may be fixed. The drive electrode driver 14 illustrated in FIG. 1 selects the drive electrode block B3 out of the drive electrode blocks B, which are the targets of the touch detection operation, illustrated in FIG. 13 and applies the touch drive signal VcomAC to the drive electrode block B3. The drive electrode driver 14 then selects the drive electrode block B4 out of the drive electrode blocks B illustrated in FIG. 14 and applies the touch drive signal VcomAC to the drive electrode block B4. The drive electrode driver 14 then selects the drive electrode block B5 out of the drive electrode blocks B illustrated in FIG. 15 and applies the touch drive signal VcomAC to the drive electrode block B5. In this way, the drive electrode driver 14 sequentially selects the drive electrode block B and applies the touch drive signal VcomAC to the selected drive electrode block B until all of the drive electrode blocks B are scanned. The number of drive electrode blocks B is not limited to 20.

In the touch detection device 30, the drive electrode block B illustrated in FIGS. 13 to 15 corresponds to the drive electrode E1 in the basic principle of electrostatic capacitance type touch detection described above. In the touch detection device 30, the touch detection electrode TDL (one electrode pattern) corresponds to the touch detection electrode E2. The touch detection device 30 detects a touch in accordance with the basic principle described above. As illustrated in FIG. 12, the electrode patterns intersecting with each other in a grade separation manner form electrostatic capacitive touch sensors in a matrix. The touch detection device 30 thus can also detect the position where the contact or approach of an externally approaching object occurs by scanning the entire touch detection surface of the touch detection device 30.

As illustrated in FIG. 16, the display unit with a touch detection function 10 performs a display scan Scand in such a manner that the gate driver 12 line sequentially scans the scan line GCL in a time-division multiplexing manner. As illustrated in FIG. 16, the display unit with a touch detection function 10 performs a touch detection scan Scant in which one time scan is completed in a time W1 in such a manner that the drive electrode driver 14 sequentially selects and drives the drive electrode block B. As illustrated in FIG. 16, the scan speed of the touch detection scan Scant is double that of the display scan Scand. The scan speed of the touch detection set faster than that of the display enables the display device with a touch detection function 1 to quickly respond to the touch of an externally approaching object approaching externally. As a result, a response performance of the touch detection can be improved. The relation between the touch detection scan Scant and the display scan Scand is not limited to that illustrated in FIG. 16. The scan speed of the touch detection scan Scant may be more than or less than double that of the display scan Scand, for example.

Drive Signal Generator and Drive Electrode Driver

Figure 17:
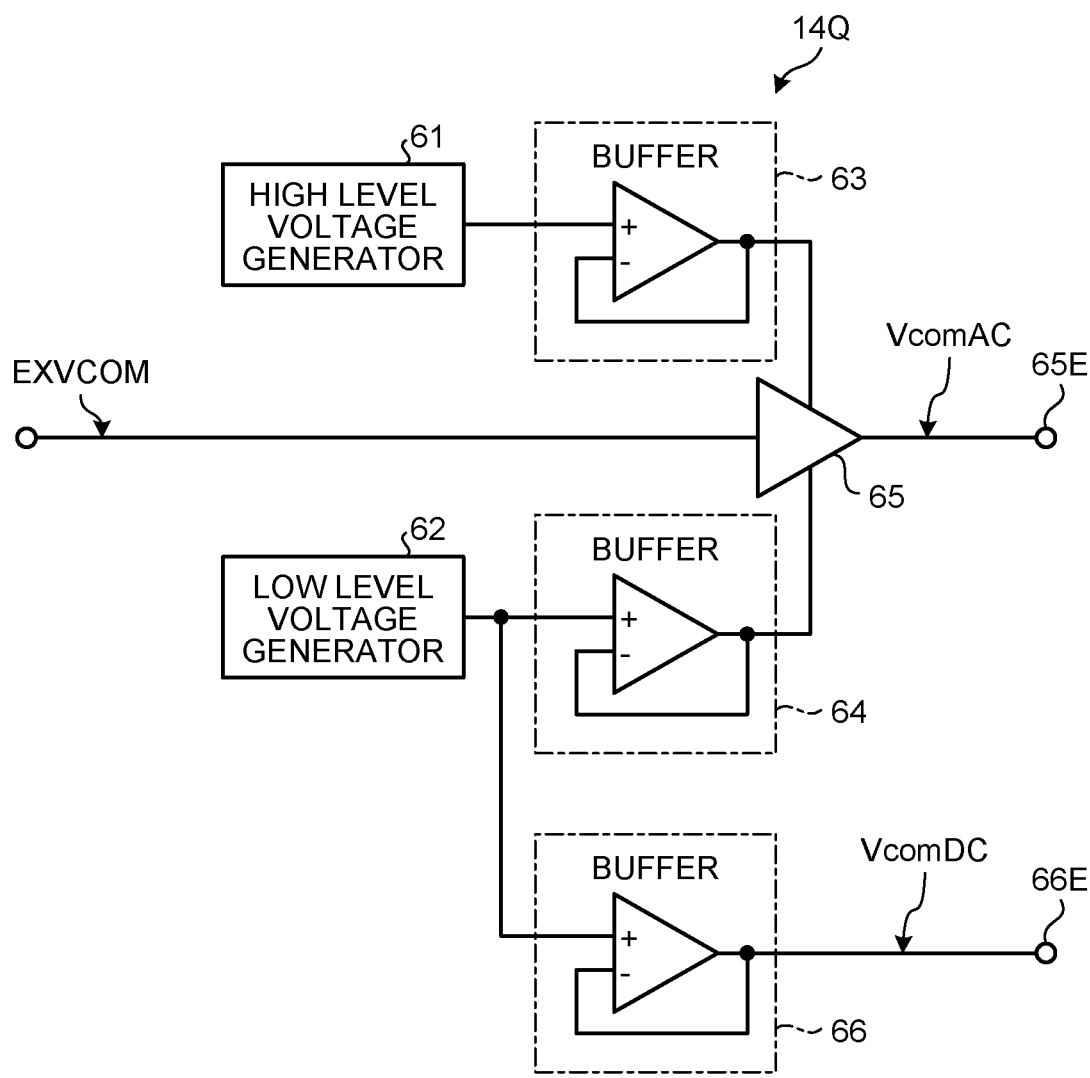
FIG. 17 is a block diagram illustrating a drive signal generator of a drive electrode driver according to the first embodiment.

FIG. 17 is a block diagram illustrating a drive signal generator of the drive electrode driver according to the first embodiment. A drive signal generator 14Q includes a high level voltage generator 61, a low level voltage generator 62, buffers 63, 64, and 66, and a switching circuit 65.

The high level voltage generator 61 generates a high level voltage of the touch drive signal VcomAC. The low level voltage generator 62 generates a direct-current voltage of the display drive voltage VcomDC. The voltage generated by the low level voltage generator 62 is also used as a low level voltage of the touch drive signal VcomAC. The buffer 63 outputs the voltage supplied from the high level voltage generator 61 while performing impedance conversion and supplies the resulting output to the switching circuit 65. The buffer 64 outputs the voltage supplied from the low level voltage generator 62 while performing impedance conversion and supplies the resulting output to the switching circuit 65. Based on a drive control signal EXVCOM, the switching circuit 65 alternately repeats a state with the drive control signal EXVCOM in a high level state and another state with the drive control signal EXVCOM in a low level state to generate the touch drive signal VcomAC. When the drive control signal EXVCOM is at the high level, the switching circuit 65 outputs the voltage supplied from the buffer 63, while when the drive control signal EXVCOM is at the low level, the switching circuit 65 outputs the voltage supplied from the buffer 64. When the drive control signal EXVCOM is at the low level, the switching circuit 65 outputs the voltage supplied from the buffer 64 as the display drive voltage VcomDC of the direct-current voltage based on the drive control signal EXVCOM. The buffers 63 and 64 are voltage followers, for example. The voltage output from the switching circuit 65 is output to an output terminal 65E. The buffer 66 outputs the voltage supplied from the low level voltage generator 62 while performing impedance conversion and supplies the display drive voltage VcomDC of the direct-current voltage to an output terminal 66E.

Figure 18:
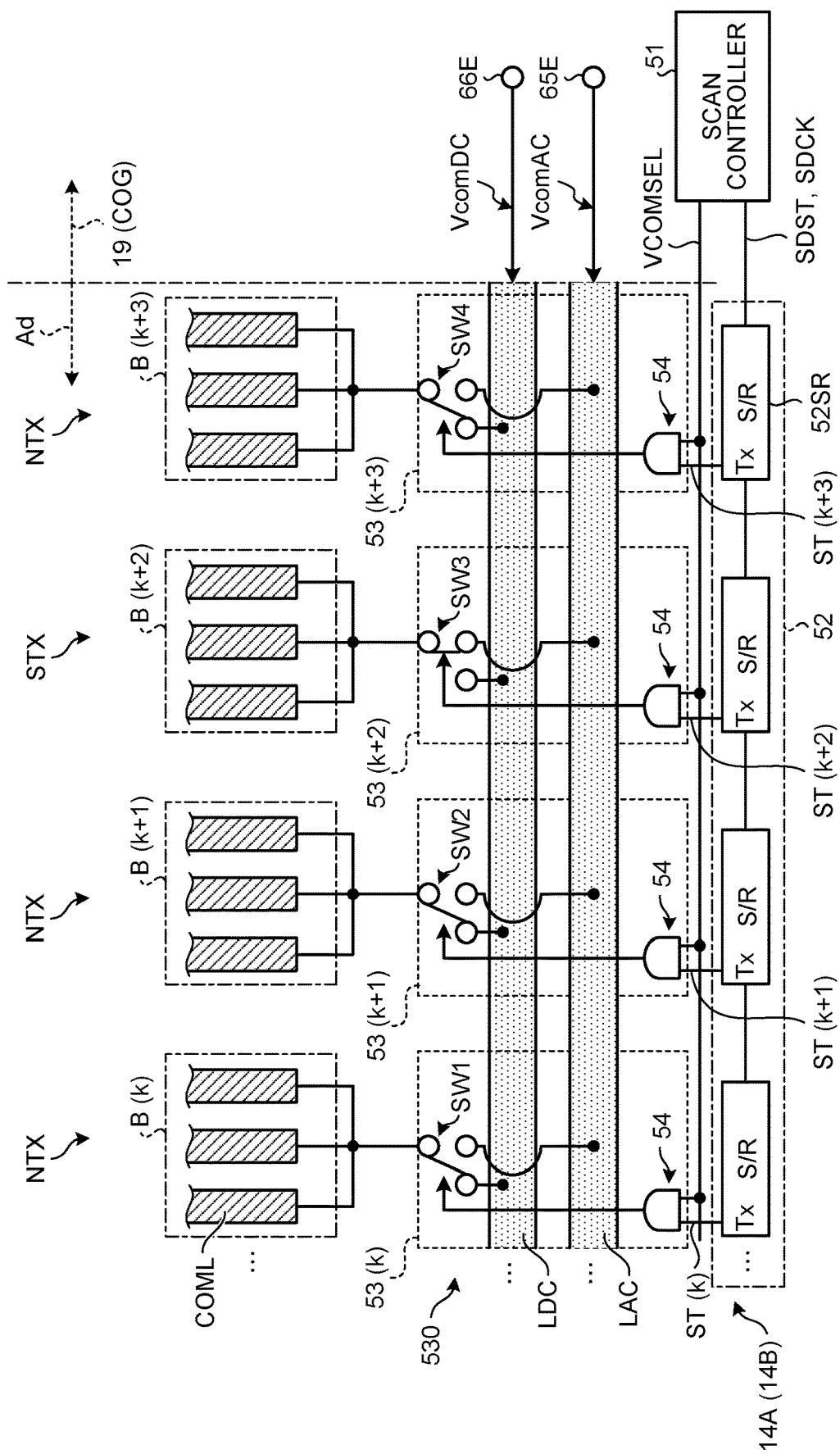
FIG. 18 is a block diagram illustrating the drive electrode driver according to the first embodiment.

FIG. 18 is a block diagram illustrating the drive electrode driver according to the first embodiment. The drive electrode scan units 14A and 14B each include a scan controller 51, a touch detection scan unit 52, and a drive unit 530. The drive unit 530 includes drive sections 53 (k) to 53 (k+3). The number of drive sections is the same as the number of drive electrode blocks B. The scan controller 51 is mounted on the COG 19. The touch detection scan unit 52 and the drive unit 530 are arranged in the frame located at the periphery of the display area Ad. Hereinafter, any one of the drive sections 53 (k) to 53 (k+3) is described as the drive section 53.

The scan controller 51 supplies a control signal SDCK and a scan start signal SDST to the touch detection scan unit 52 based on the control signal supplied from the control unit 11. The display drive voltage VcomDC output from the drive signal generator 14Q through the output terminal 66E is supplied to the display wiring LDC. The touch drive signal VcomAC output from the drive signal generator 14Q through the output terminal 65E is supplied to the touch wiring LAC. The scan controller 51 supplies a drive electrode selecting signal VCOMSEL to the drive unit 530.

The touch detection scan unit 52 includes drive electrode shift registers 52SR and generates scan signals ST (k), ST (k+1), ST (k+2), ST (k+3), and so on. The scan signals ST select the respective corresponding drive electrodes COML to which the touch drive signal VcomAC is applied. Specifically, in the touch detection scan unit 52, the scan start signal SDST supplied from the scan controller 51 triggers the operation of the shift register 52SR. The control signal SDCK is transferred to the respective shift registers 52SR at respective transferring stages, and thereby, the respective shift registers 52SR at respective transferring stages are sequentially selected in synchronization with the control signal SDCK. The selected shift registers 52SR send the scan signals, ST (k), ST (k+1), ST (k+2), ST (k+3), and so on, to the respective AND circuits 54 of the drive unit 530. In the touch detection scan unit 52, when the selected shift register 52SR supplies the high level signal to the (k+2)th drive section 53 (k+2) as the (k+2)th scan signal ST (k+2), for example, the drive section 53 (k+2) applies the drive signal VcomAC to the drive electrodes COML included in the (k+2)th drive electrode block B (k+2). Hereinafter, any one of the scan signals, ST (k), ST (k+1), ST (k+2), ST (k+3), and so on may be referred to as the scan signal ST.

The drive unit 530 is a circuit that applies the display drive voltage VcomDC or the touch drive signal VcomAC supplied from the drive signal generator 14Q to the drive electrodes COML based on the scan signal ST supplied from the touch detection scan unit 52 and the drive electrode selecting signal VCOMSEL supplied from the scan controller 51. The drive sections 53 are provided one each for the output signals of the touch detection scan unit 52 and supply the drive signal Vcom to the respective corresponding drive electrode blocks B.

Each drive section 53 includes the AND circuit 54 and a selection switch SW for the corresponding drive electrode block B. The selection switches SW are illustrated as the selection switches SW1, SW2, SW3, and SW4 in FIG. 18. The AND circuit 54 generates and outputs the logical product (AND) of the scan signal ST supplied from the touch detection scan unit 52 and the drive electrode selecting signal VCOMSEL supplied from the scan controller 51. The AND circuit 54 has a buffering function to amplify the amplitude to a level capable of controlling the operation of the selection switch SW1. In the following description, the selection switch SW1 is explained as the representative example of the selection switches SW1. The operation of the selection switch SW1 is controlled based on the signal supplied from the AND circuit 54. The one end of the selection switch SW1 is coupled to the multiple drive electrodes COML included in the drive electrode block B while the other end of the selection switch SW1 is coupled to either the display wiring LDC or the touch wiring LAC.

The drive section 53 thus configured outputs the touch drive signal VcomAC as the drive signal Vcom when the scan signal ST is at the high level and the drive electrode selecting signal VCOMSEL is at the high level. When the scan signal ST is at the low level and the drive electrode selecting signal VCOMSEL is at the low level, the drive section 53 disconnects the drive electrode block B from the touch wiring LAC and couples drive electrode block B to the display wiring LDC. The drive electrode block B selected as the output destination of the touch drive signal VcomAC is a selected drive electrode block STX. The drive electrode block B that is not selected as the output destination of the touch drive signal VcomAC is a not-selected drive electrode block NTX. For example, in FIG. 18, the selected drive electrode block STX is the drive electrode block B (k+2) when the drive section 53 (k+2) applies the drive signal VcomAC to the plurality of drive electrodes COML included in the (k+2)th drive electrode block B (k+2). The drive electrode blocks B (k), B (k+1), and B (k+3), which are not selected as the output destinations of the drive signal VcomAC, are the not-selected drive electrode blocks NTX.

When the liquid crystal display unit 20 is in the display operation, i.e., the scan signal ST is at the low level, the drive section 53 couples the selection switches SW1, SW2, SW3, and SW4 for the respective corresponding drive electrode blocks B to the display wiring LDC and outputs the display drive voltage VcomDC as the drive signal Vcom.

Figure 19:
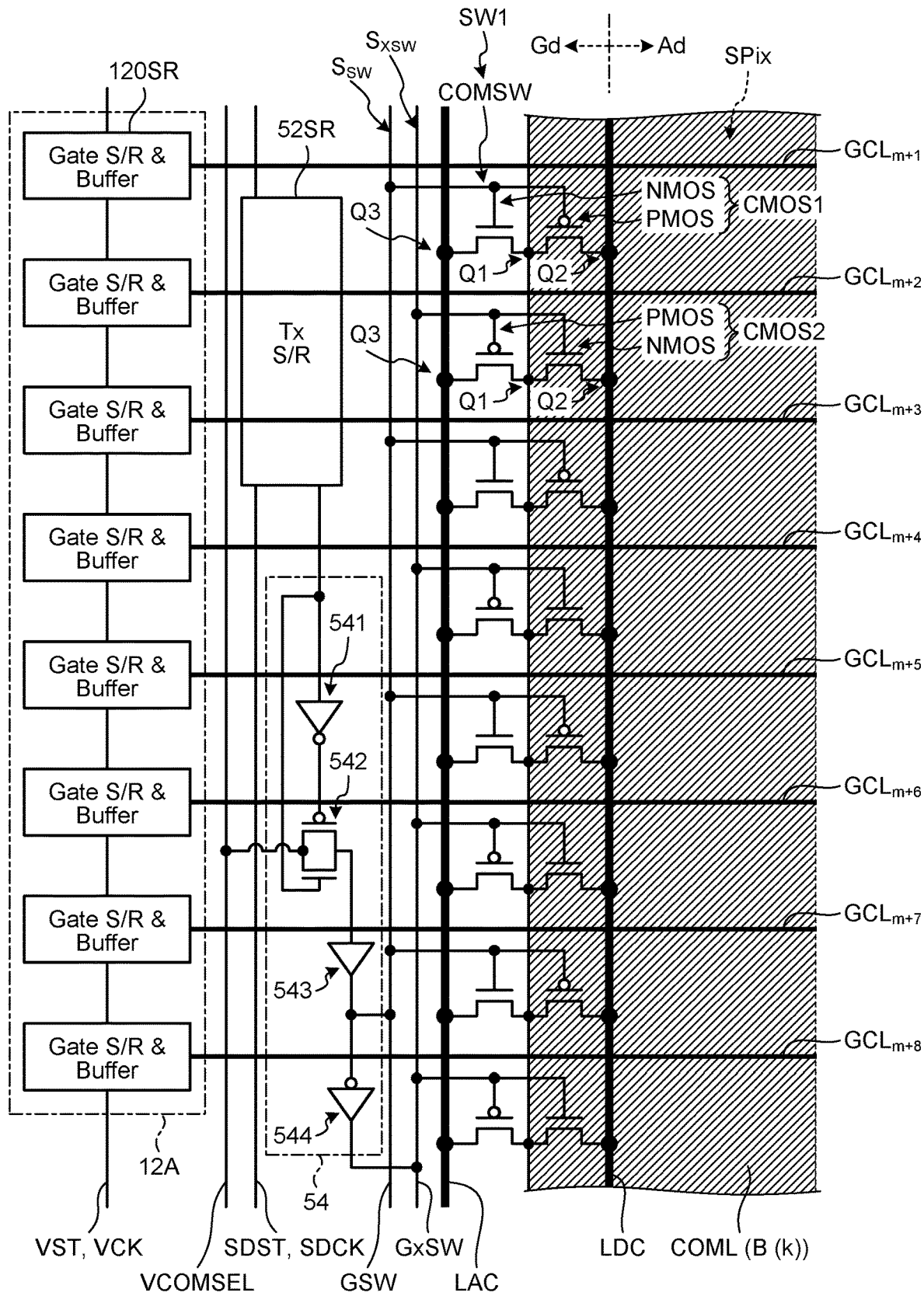
FIG. 19 is a block diagram illustrating a drive unit of the drive electrode driver according to the first embodiment.
Figure 20:
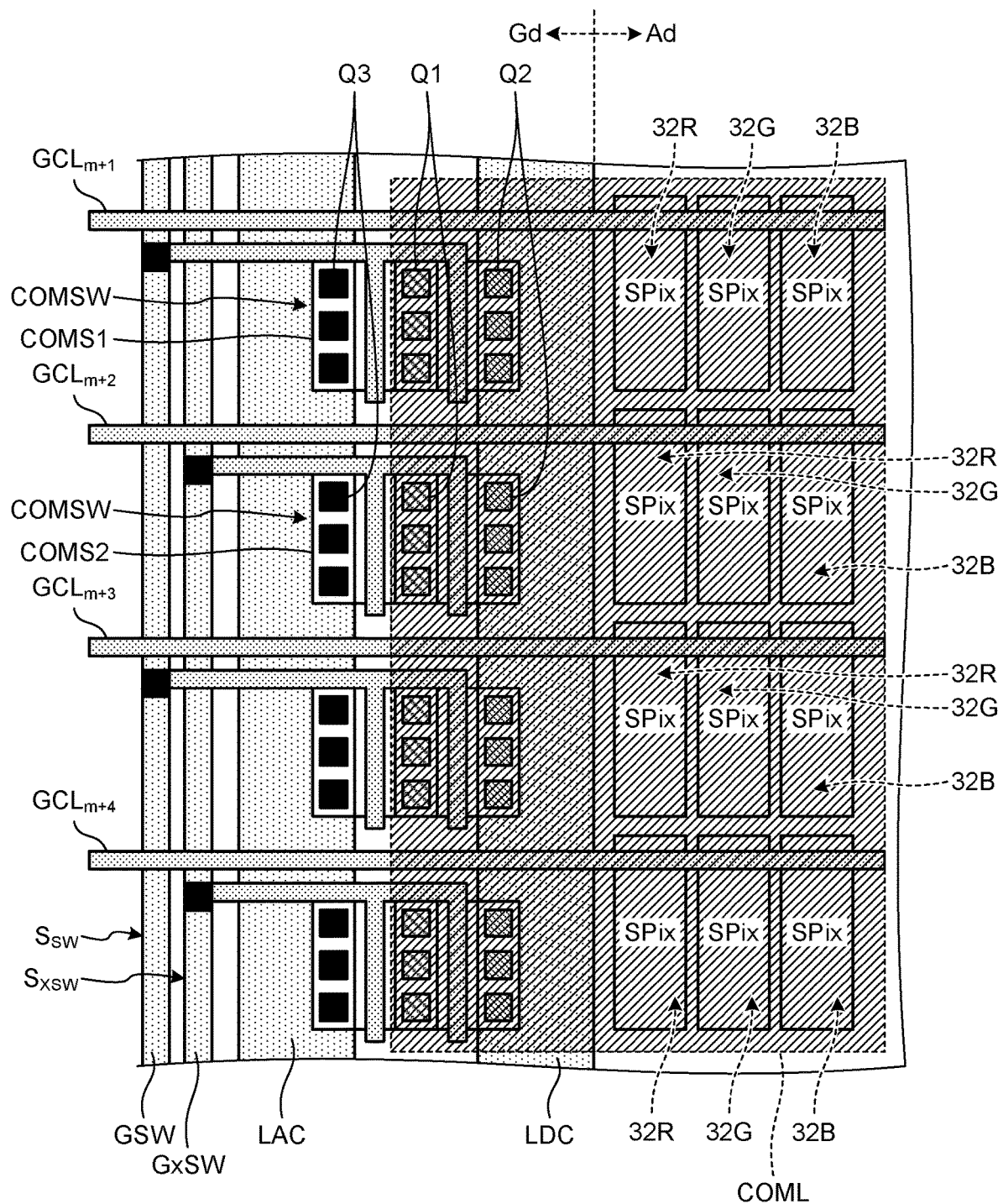
FIG. 20 is a block diagram illustrating an arrangement example of selection switches of the drive electrode driver according to the first embodiment.

FIG. 19 is a block diagram illustrating the drive unit of the drive electrode driver according to the first embodiment. FIG. 20 is a block diagram illustrating an arrangement example of the selection switches of the drive electrode driver according to the first embodiment. In FIGS. 19 and 20, the configuration on the first gate driver 12A side is described. The configuration on the second gate driver 12B side is the same as that on the first gate driver 12A side. In the following description, the selection switch SW1 is explained as the representative example. The other selection switches SW2, SW3, and SW4 have the same configuration as the selection switch SW1. The first gate driver 12A (the second gate driver 12B) includes gate shift registers 120SR. Each gate shift register 120SR starts the operation in response to the vertical start pulse VST, and then is sequentially selected in the vertical scan direction in synchronization with the vertical clock VCK, and outputs a vertical selection pulse to the scan line GCL through a buffer circuit.

The selection switch SW1 includes a plurality of switches COMSW provided for each drive electrode COML. All of the switches COMSW operate for each drive electrode COML in response to switch control signals Ssw and Sxsw. All of the switches COMSW operate for each drive electrode COML and select either the connection between the touch wiring LAC and the drive electrode COML or the connection between the display wiring LDC and the drive electrode COML in a time-division manner.

When one circuit unit composed of a CMOS switch CMOS1 and a CMOS switch CMOS2 is used as the switch COMSW, multiple circuit units are provided for each drive electrode COML. The CMOS switches CMOS1 and CMOS2 each include a transistor NMOS having an N channel gate and a transistor PMOS having a P channel gate.

In the CMOS switch CMOS1, a switch signal line GSW is coupled to the gates of the transistor NMOS and the transistor PMOS. In the CMOS switch CMOS2, a switch signal line GxSW is coupled to the gates of the transistor NMOS and the transistor PMOS. The switch control signal Ssw is supplied to the switch signal line GSW and the switch control signal Sxsw is supplied to the switch signal line GxSW. High and low levels in potential of the switch control signals Ssw and Sxsw are reversed to each other. The CMOS switches CMOS1 and CMOS2 thus can select either the connection between the touch wiring LAC and the drive electrode COML or the connection between the display wiring LDC and the drive electrode COML in synchronization with each other as the same selection. As described above, the selection switch SW1 includes the multiple switches COMSW for each drive electrode COML and the switches COMSW are coupled in parallel with each other between the touch wiring LAC and the drive electrode COML. All of the switches COMSW operate in response to the switch control signals Ssw and Sxsw serving as selection signals for each drive electrode COML, couple the touch wiring LAC and the drive electrode COML, and supply the touch drive signal VcomAC to the drive electrode COML.

The AND circuit 54 includes an inverter 541, a switching circuit 542, a buffer 543, and an inverter 544. The inverter 541 inverts the output signal of the drive electrode shift register 52SR at the selected transferring stage and outputs the inverted signal to the AND circuit 542 when the scan signal ST is at the high level. The AND circuit 542 switches the input and output of the inverter 541 in response to the drive electrode selecting signal VCOMSEL and outputs the switch control signal Ssw to the buffer 543. The buffer 543 amplifies the switch control signal Ssw and supplies the amplified switch control signal Ssw to the switch signal line GSW. The inverter 544 inverts the switch control signal Ssw output from the buffer 543 and outputs the inverted signal as the switch control signal Sxsw to supply the signal to the switch signal line GxSW.

The CMOS switches CMOS1 and CMOS2 are coupled to the touch wiring LAC with a connecting conductor Q3. The CMOS switches CMOS1 and CMOS2 are coupled to the display wiring LDC with a connecting conductor Q2. The CMOS switches CMOS1 and CMOS2 are coupled to the drive electrode COML with a connecting conductor Q1. The CMOS switches CMOS1 and CMOS2 can select either the connection between the connecting conductors Q1 and Q2 or the connection between the connecting conductors Q3 and Q1 by the switch control signals Ssw and Sxsw input to the gates of the respective transistors NMOS and the respective transistors PMOS.

As illustrated in FIG. 20, the scan line GCL is wired on the same layer as the switch signal lines GSW and GxSW. The scan line GCL is also coupled to the gate of the transistor in a similar manner as the switch signal lines GSW and GxSW. These lines are formed in the same process, which can reduce the manufacturing process. The scan line GCL intersects with the touch wiring LAC and the display wiring LDC in a grade separation manner with an insulation layer interposed therebetween. The selection switch SW1 is disposed in an area between the scan lines GCL (e.g., the scan lines $GCL_{m+1}$ and $GCL_{m+2}$) intersecting with the touch wiring LAC (the display wiring LDC). The distance between the scan lines GCL intersecting with the touch wiring LAC (the display wiring LDC) is the same as that between the adjacent scan lines GCL in the display area Ad.

The TFT substrate 21 corresponds to a specific example of a "substrate" in the disclosure. The pixel electrode 22 corresponds to a specific example of a "pixel electrode" in the disclosure. The pixel signal line SGL corresponds to a specific example of a "signal line" in the disclosure. The drive electrode COML corresponds to a specific example of a "drive electrode" in the disclosure. The liquid crystal element LC corresponds to a specific example of a "display function layer" in the disclosure. The gate driver 12, the source driver 13, and the drive electrode driver 14 correspond to specific examples of a "controller" in the disclosure. The touch detection electrode TDL corresponds to a "touch detection electrode" in the disclosure. The touch wiring LAC corresponds to a specific example of "touch wiring" in the disclosure.

1-1B. Operation and Action

The following describes the operation and action of the display device with a touch detection function 1 in the first embodiment. In the following description, the drive signal Vcom serving as the drive signal for display is described as the display drive voltage VcomDC while the drive signal Vcom serving as the drive signal for touch detection is described as the touch drive signal VcomAC.

Operation of the Display Device With a Touch Detection Function

Figure 21:
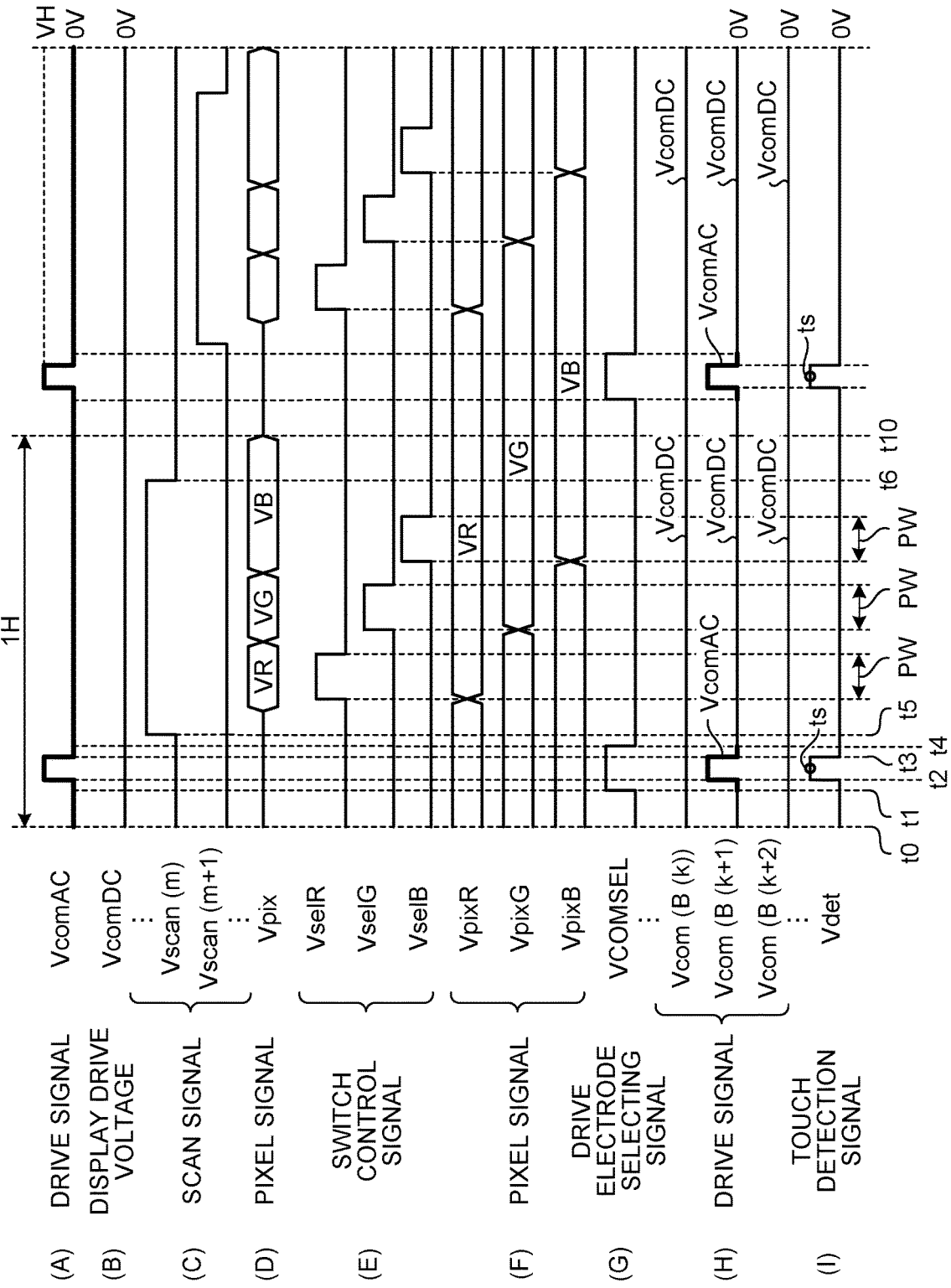
FIG. 21 is an explanatory diagram illustrating an example of timing waves of the display device with a touch detection function.
Figure 22:
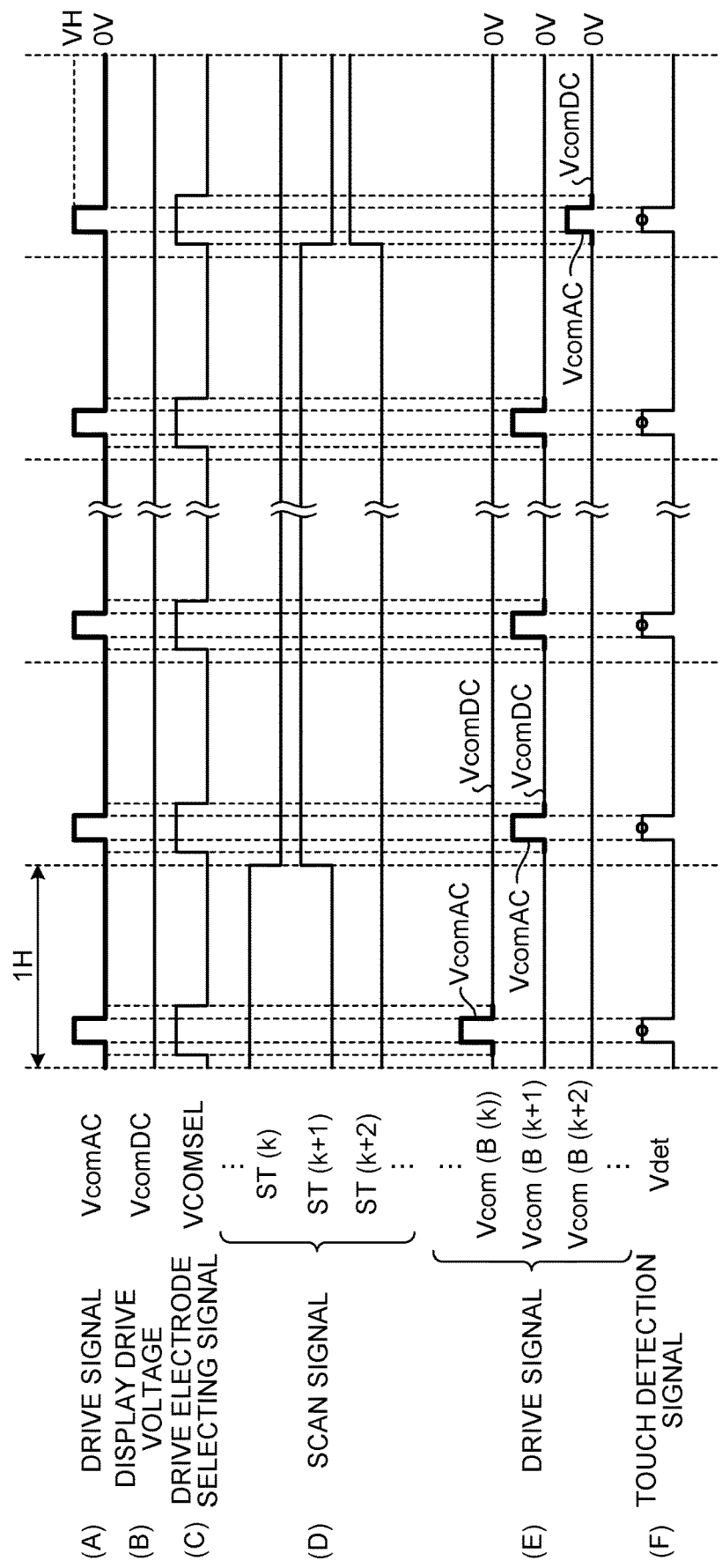
FIG. 22 is an explanatory diagram illustrating an operation example of touch detection scan.

The following describes the operation of the display device with a touch detection function 1. FIG. 21 is an explanatory diagram illustrating an example of timing waves of the display device with a touch detection function. FIG. 22 is an explanatory diagram illustrating an operation example of touch detection scan.

In FIG. 21, (A) illustrates a waveform of the touch drive signal VcomAC. In FIG. 21, (B) illustrates a waveform of the display drive signal VcomDC. In FIG. 21, (C) illustrates a waveform of the scan signal Vscan. In FIG. 21, (D) illustrates a waveform of the pixel signal Vpix. In FIG. 21, (E) illustrates a waveform of the switch control signal Vsel. In FIG. 21, (F) illustrates a waveform of the pixel signal Vpix. In FIG. 21, (G) illustrates a waveform of the drive electrode selecting signal VCOMSEL. In FIG. 21, (H) illustrates a waveform of the display drive signal Vcom. In FIG. 21, (I) illustrates a waveform of the touch detection signal Vdet.

In the display device with a touch detection function 1, the touch detection operation and the display operation are performed in each horizontal period (1H). In the display operation, the gate driver 12 sequentially applies the scan signal Vscan to the scan line GCL. In the touch detection operation, the drive electrode driver 14 performs the touch detection scan by sequentially applying the touch drive signal VcomAC to each drive electrode block B and the touch detection unit 40 detects the touch based on the touch detection signal Vdet output from the touch detection electrodes TDL. The details are described below.

At timing t0, one horizontal period (1H) starts. At timing t1, the scan controller 51 of the drive electrode driver 14 changes the voltage of the drive electrode selecting signal VCOMSEL from the low level to the high level ((G) in FIG. 21). As a result, in the drive electrode driver 14, the selection switch SW2 in the (k+1)th drive section 53 (k+1) used for touch detection operation selects the connection between the connecting conductors Q1 and Q2. As a result of the selection, the touch drive signal VcomAC ((A) in FIG. 21) generated by the drive signal generator 14Q is applied to the drive electrodes COML included in the (k+1)th drive electrode block B (k+1) corresponding to the drive section 53 (k+1) as the drive signal VcomAC (B (k+1)) through the selection switch SW2. In the drive sections 53 excluding the drive section 53 (k+1) having the selection switch SW2, the selection switches SW1, SW3, and SW4 each select the connection between the connecting conductors Q3 and Q1. As a result, the drive electrodes COML excluding the drive electrodes COML included in the drive electrode block B (k+1) have the same potential as the display wiring LDC ((H) in FIG. 21).

At timing t2, the drive signal generator 14Q changes the voltage of the touch drive signal VcomAC from the low level to the high level ((A) in FIG. 21). Specifically, the drive unit 530 changes the voltage of the touch drive signal VcomAC from the low level to the high level by the output of the switching circuit 65 supplied from the output terminal 65E in the drive signal generator 14Q. With this change, an AC rectangular wave changing from the low level to the high level is applied to the (k+1)th drive electrode block B (k+1) as the drive signal VcomAC (B (k+1)) ((H) in FIG. 21). The drive signal Vcom (B (k+1)) propagates to the touch detection electrodes TDL through electrostatic capacitances and causes the touch detection signal Vdet to change ((I) in FIG. 21). The AC rectangular wave may be a single rectangular wave.

At sampling timing ts, the A/D converter 43 of the touch detection unit 40 A/D-converts the output signal of the touch detection signal amplifier 42 to which the touch detection signal Vdet is input ((I) in FIG. 21). The touch detection signal amplifier 42 of the touch detection unit 40 performs the touch detection based on the A/D conversion results collected in a plurality of horizontal periods.

At timing t3, the drive unit 530 changes the voltage of the touch drive signal VcomAC to the drive signal Vcom for display (the display drive voltage VcomDC) ((A) in FIG. 21). Specifically, the drive unit 530 outputs the output of the buffer 66 from the output terminal 66E in the drive signal generator 14Q to change the voltage of the touch drive signal VcomAC to the display drive voltage VcomDC. With this change, the drive signal Vcom (B (k+1)) applied to the (k+1)th drive electrode block B (k+1) is changed from the high level to the low level ((H) in FIG. 21) and the touch detection signal Vdet is changed ((I) in FIG. 21).

03475At timing t4, the scan controller 51 of the drive electrode driver 14 changes the voltage of the drive electrode selecting signal VCOMSEL from the high level to the low level ((G) in FIG. 21). As a result, all of the selection switches SW1 to SW4 select the connection between the connecting conductors Q2 and Q1. The display drive voltage VcomDC ((B) in FIG. 21) generated by the drive signal generator 14Q is applied to the drive electrodes COML included in the respective corresponding drive electrode blocks B through all of the selection switches SW1 to SW4 ((H) in FIG. 21).

At timing t5, the gate driver 12 applies the scan signal Vscan to the m-th scan line GCL (m) used for the display operation and the voltage of the scan line GCL (m) is changed from the low level to the high level ((c) in FIG. 21). The source driver 13 and the source selector 13S apply the pixel signal Vpix to the pixel signal line SGL ((F) in FIG. 21) such that the pixels Pix included in one horizontal line relating to the m-th scan line GCL (m) perform display.

Specifically, at timing t5, the gate driver 12 selects one horizontal line used for the display operation by changing the voltage of the scan signal Vscan (m) from the low level to the high level. The source driver 13 supplies the pixel voltage VR for the sub-pixel SPix of red to the source selector 13S as the image signal Vsig ((D) in FIG. 21), generates the switch control signal VselR, which keeps the high level during a period of supplying the pixel voltage VR, and supplies the generated switch control signal VselR to the source selector 13S ((E) in FIG. 21). The source selector 13S separates the pixel voltage VR supplied from the source driver 13 from the image signal Vsig by turning on the switch SWR during a period (a writing period PW) in which the voltage of the switch control signal VselR is at the high level, and supplies the separated pixel voltage VR to the sub-pixels SPix of red in the horizontal line as the pixel signal VpixR through the pixel signal line SGL ((F) in FIG. 21). After the switch SWR is turned off, the pixel signal line SGL is in the floating state. As a result, the voltage of the pixel signal line SGL is maintained ((F) in FIG. 21). Likewise, the source driver 13 supplies the pixel voltage VG for the sub-pixels SPix of green to the source selector 13S together with the corresponding switch control signal VselG ((D) and (E) in FIG. 21). The source selector 13S separates the pixel voltage VG from the image signal Vsig based on the switch control signal VselG, and supplies the pixel voltage VG to the sub-pixels SPix of green in the horizontal line as the pixel signal VpixG through the pixel signal line SGL ((F) in FIG. 21). Likewise, the source driver 13 supplies the pixel voltage VB for the sub-pixels SPix of blue to the source selector 13S together with the corresponding switch control signal VselB ((D) and (E) in FIG. 21). The source selector 13S separates the pixel voltage VB from the image signal Vsig based on the switch control signal VselB, and supplies the pixel voltage VB to the sub-pixels SPix of blue in the horizontal line as the pixel signal VpixB through the pixel signal line SGL ((F) in FIG. 21).

At timing t6, the gate driver 12 changes the voltage of the scan signal Vscan (m) of the m-th scan line GCL from the high level to the low level ((C) in FIG. 21). As a result, the sub-pixels SPix on the horizontal line used for the display operation are electrically isolated from the pixel signal line SGL.

At timing t10, the horizontal period ends and a new horizontal period starts.

With the repetition of the operation described above, in the display device with a touch detection function 1, the display operation is performed on the entire display screen by the line sequential scanning and touch detection operation is performed on the entire touch detection surface by scanning each drive electrode block B in the following manner.

(A) in FIG. 22 illustrates a waveform of the touch drive signal VcomAC. (B) in FIG. 22 illustrates a waveform of the display drive signal VcomDC. (C) in FIG. 22 illustrates a waveform of the drive electrode selecting signal VCOMSEL. (D) in FIG. 22 illustrates a waveform of the scan signal ST. (E) in FIG. 22 illustrates a waveform of the display drive signal Vcom. (F) in FIG. 22 illustrates a waveform of the touch detection signal Vdet.

The drive electrode driver 14 performs the touch detection scan by sequentially applying the touch drive signal VcomAC to the respective corresponding drive electrode blocks B ((E) in FIG. 22) based on the scan signal ST ((D) in FIG. 22) generated by the touch detection scan unit 52. In the touch detection scan, the drive electrode driver 14 applies the touch drive signal VcomAC to the respective drive electrode blocks B in a certain plurality of horizontal periods ((E)in FIG. 22). The touch detection unit 40 samples the touch detection signal Vdet based on the touch drive signal VcomAC in each horizontal period 1H. After the touch detection unit 40 completes the sampling in the last horizontal period of the plurality of horizontal periods, the signal processor 44 detects whether a touch exists in areas corresponding to the respective drive electrode blocks B based on the plurality of sampling results. The touch detection thus performed based on the plurality of sampling results enables the sampling results to be statistically analyzed, thereby making it possible to reduce the deterioration of a signal-to-noise (S/N) ratio due to variations in sampling results. As a result, touch detection accuracy can be increased. The touch drive signal VcomAC illustrated in FIG. 21 or 22 has a single rectangular wave for schematically explaining the signal. The touch drive signal VcomAC may be composed of a plurality of waves as illustrated in FIG. 6. The display device with a touch detection function 1 according to the first embodiment separates the touch detection operation (touch detection operation period) and the displaying operation (displaying period) and supplies the drive signal Vcom (the display drive voltage VcomDC and the drive signal VcomAC) to the drive electrodes COML in a time-division manner. As described above, the display device with a touch detection function 1 according to the first embodiment may separate the touch detection operation (touch detection operation period) and the displaying operation (displaying period) and supply the drive signal Vcom (the display drive voltage VcomDC and the drive signal VcomAC) to the drive electrodes COML in a time-division manner, in one display horizontal period. The display device with a touch detection function 1 according to the first embodiment may separate a plurality of times of touch detection operation (touch detection operation periods) and a plurality of times of displaying operation (displaying periods) and supply the drive signal Vcom (the display drive voltage VcomDC and the drive signal VcomAC) to the drive electrodes COML in a time-division manner, in one display horizontal period. The display device with a touch detection function 1 according to the first embodiment may separate the touch detection operation (touch detection operation period) and the displaying operation (displaying period) and process the display operation corresponding to a plurality of horizontal periods in one display period.

1-1C. Advantages

As described above, in display device with a touch detection function 1 according to the first embodiment, the display wiring LDC supplying the display drive voltage VcomDC to the drive electrodes COML and the touch wiring LAC supplying the touch drive signal VcomAC to the drive electrodes COML are routed in the frame areas. For example, in the liquid crystal display device using a liquid crystal of a lateral electric field mode such as FFS, the display function layer tends to operate stably when the display wiring LDC is arranged close to the pixels corresponding to the color areas 32R, 32G, and 32B. Thus, the selection switches SW1 to SW4 are arranged between the touch wiring LAC and the display wiring LDC. The selection switches SW1 to SW4 each includes the connecting conductors Q1, Q2, and Q3 as through holes in different layers. The selection switch SW1 (as the representative example of the selection switches SW1, SW2, SW3, and SW4) includes the multiple switches COMSW for each drive electrode COML. All of the switches COMSW operate in response to the switch control signals Ssw and Sxsw to couple the touch wiring LAC to the drive electrode COML and apply the touch drive signal VcomAC to the drive electrode COML. This configuration can reduce the interconnection resistance in the selection switch SW1 by increasing the number of connecting conductors Q1, Q2, and Q3, which supply power.

The touch wiring LAC has a predetermined interconnection resistance component of the switch SW1 and a parasitic capacitance between itself and the drive electrodes COML included in the drive electrode block B to which the drive signal VcomAC is applied through the touch wiring LAC. Thus, the transition time of the pulse of the drive signal VcomAC may get longer at the drive electrode block B disposed away from the COG 19 (drive signal generator). In the selection switch SW1 according to the first embodiment, the multiple CMOS switches CMOS1 and CMOS2 of the switch COMSW are provided in parallel with each other between the touch wiring LAC and the drive electrode COML, for each drive electrode COML. All of the CMOS switches CMOS1 and CMOS2 operate in response to the switch control signals serving as the selection signals to couple the touch wiring LAC to the drive electrode COML, and can supply the touch drive signal VcomAC to the drive electrode COML. This configuration enables the display device with a touch detection function 1 according to the first embodiment to reduce the interconnection resistance of the switch SW1. As a result, the display device with a touch detection function 1 according to the first embodiment can reduce the potentiality that the transition time of the pulse of the drive signal VcomAC gets longer at the drive electrode block B disposed near the end of the touch wiring LAC.

1-2. Second Embodiment

Figure 23:
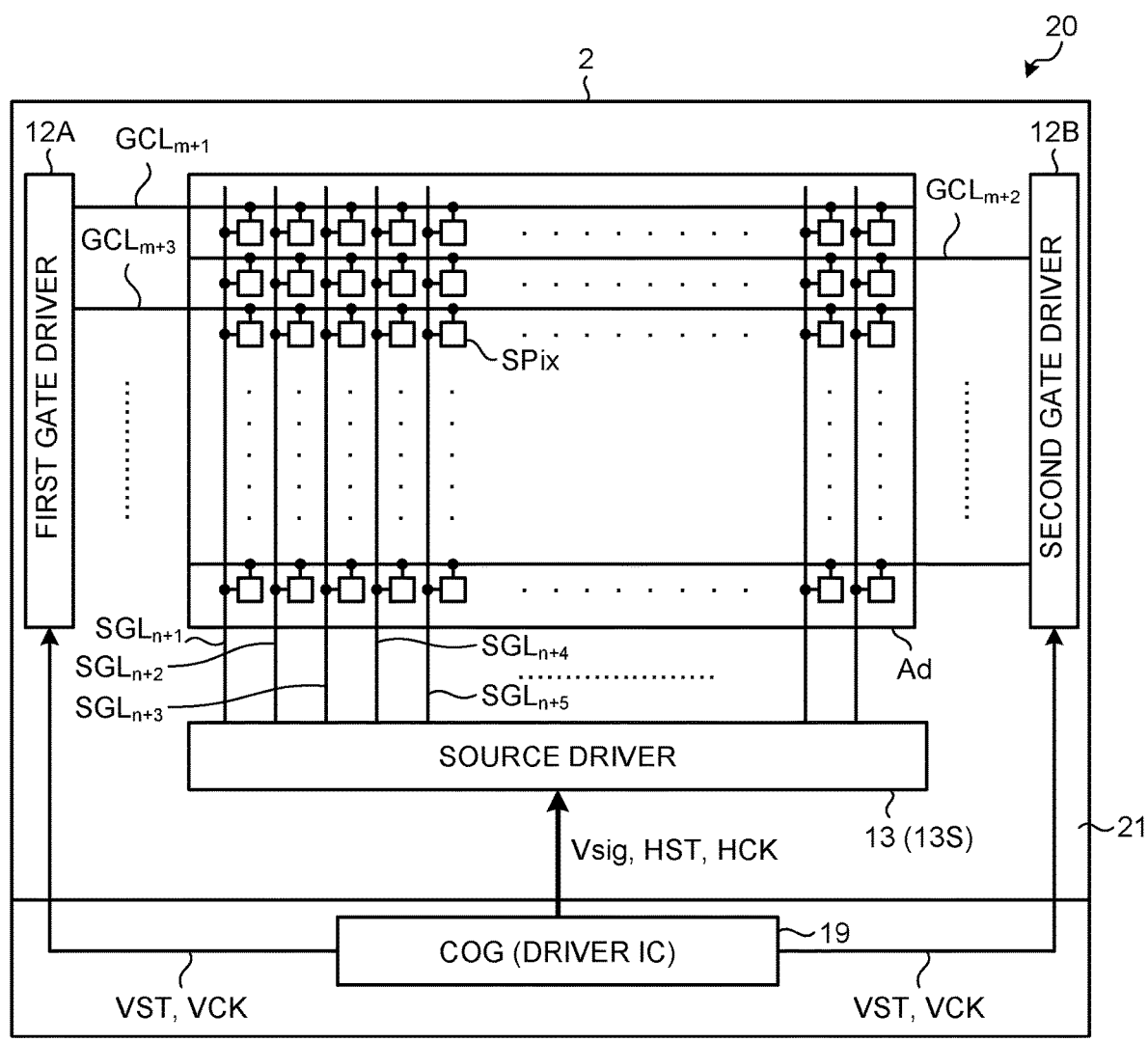
FIG. 23 is a schematic diagram illustrating an example of the controller of the display device with a touch detection function according to a second embodiment.
Figure 24:
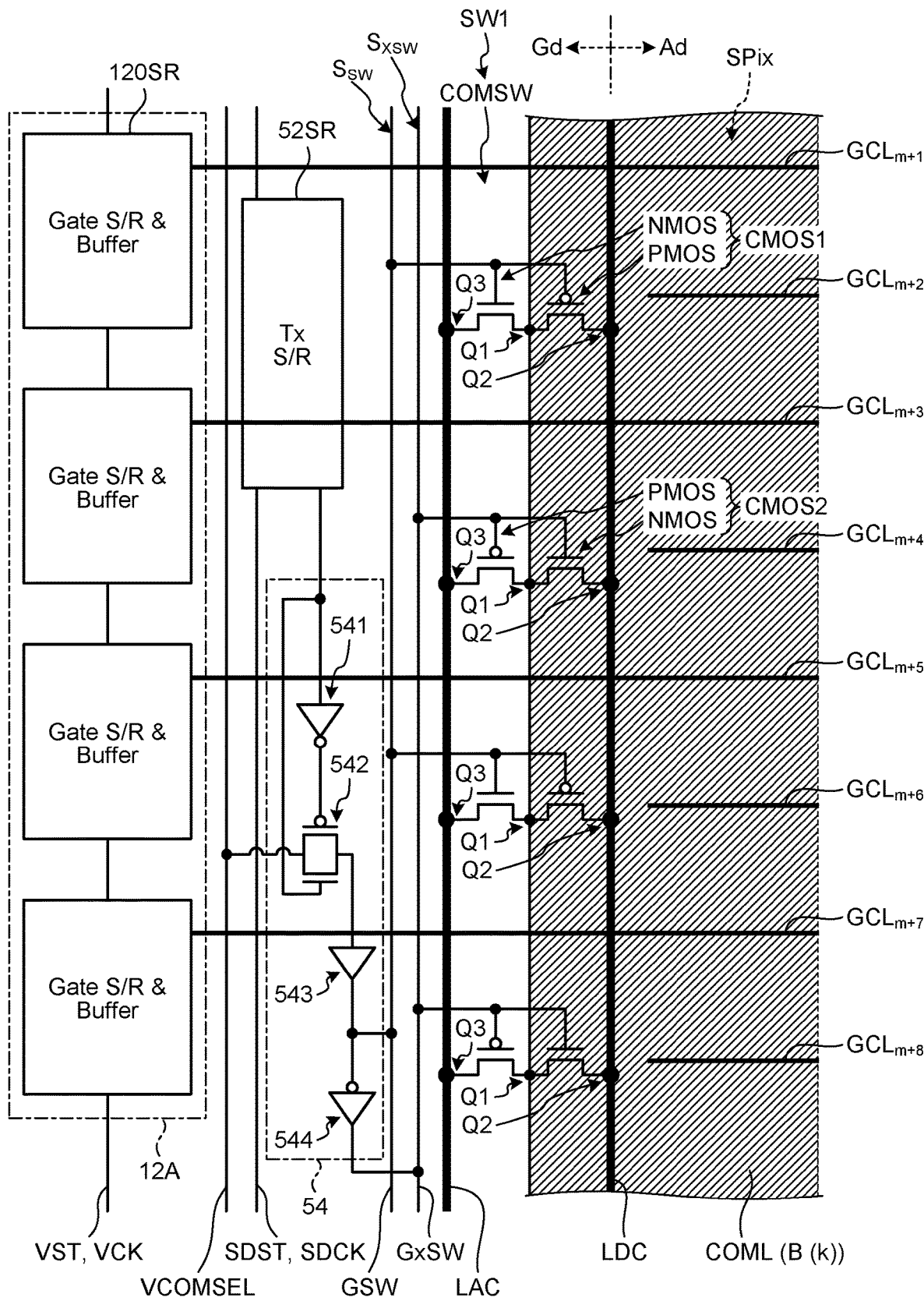
FIG. 24 is a block diagram illustrating the drive unit of the drive electrode driver according to the second embodiment.
Figure 25:
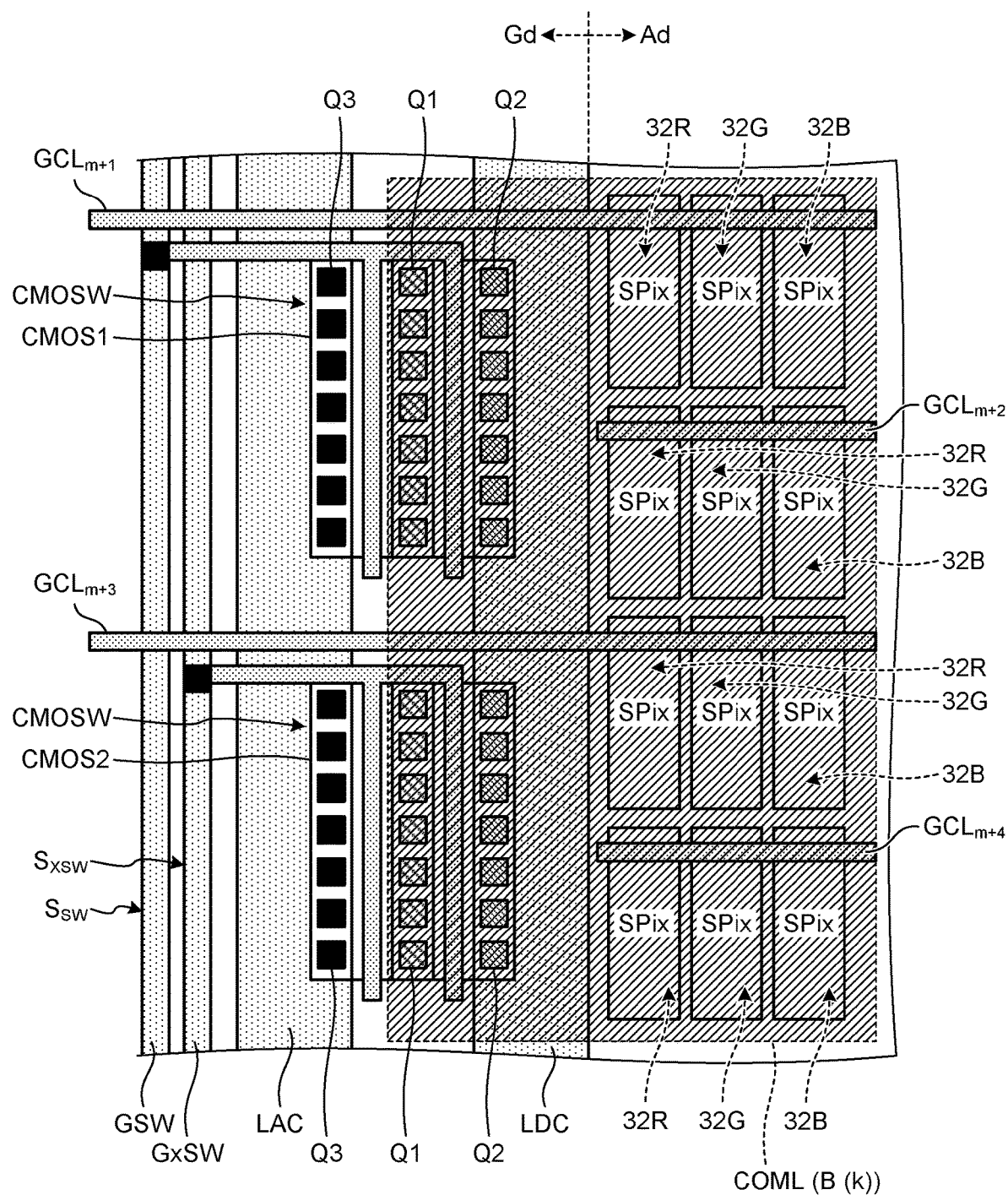
FIG. 25 is a block diagram illustrating an arrangement example of the selection switches of the drive electrode driver according to the second embodiment.
Figure 26:
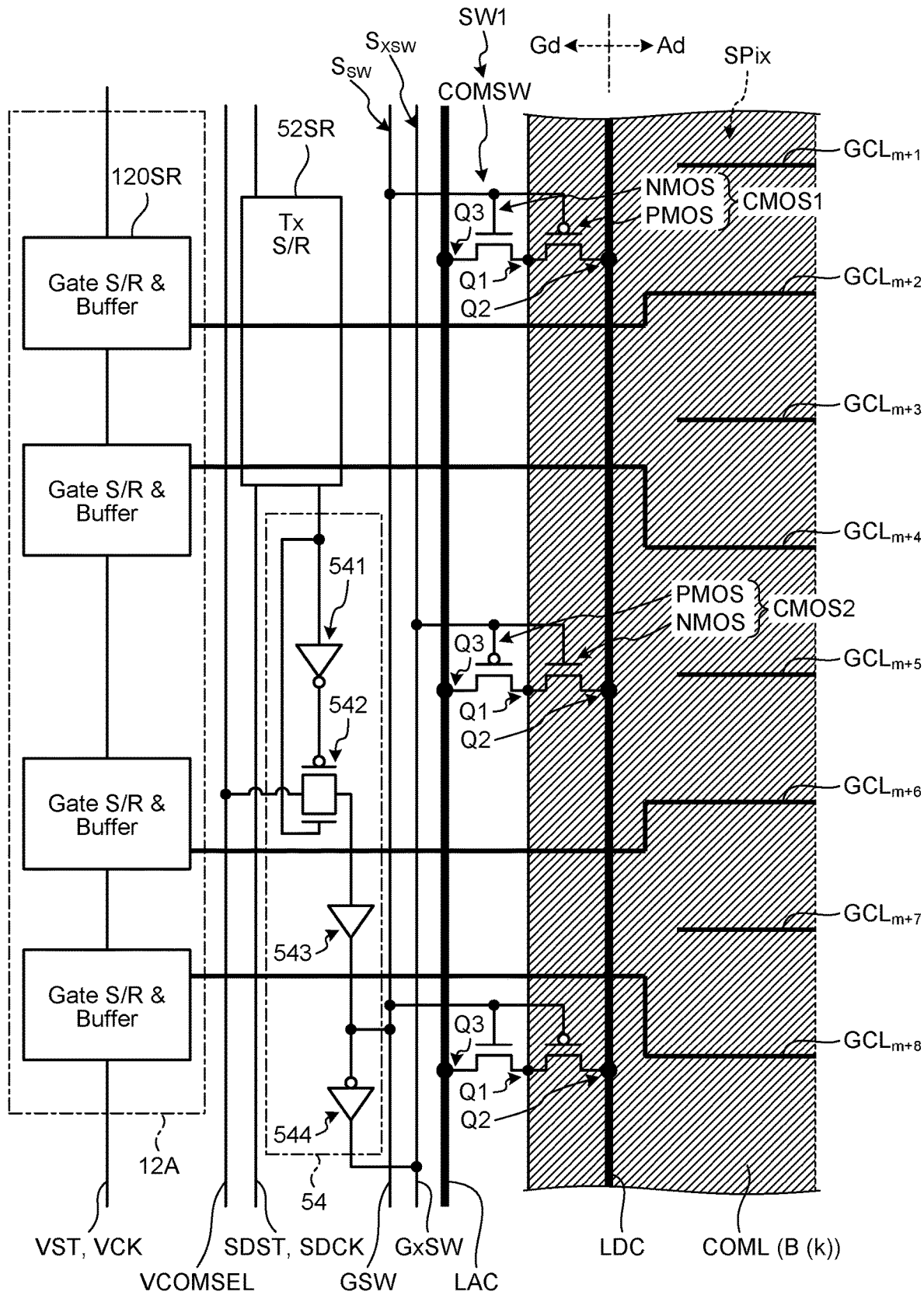
FIG. 26 is a block diagram illustrating the drive unit of the drive electrode driver according to a third embodiment.

The following describes the display device with a touch detection function 1 according to a second embodiment. FIG. 23 is a schematic diagram illustrating an example of the controller of the display device with a touch detection function according to the second embodiment. FIG. 24 is a block diagram illustrating the drive unit of the drive electrode driver according to the second embodiment. FIG. 25 is a block diagram illustrating an arrangement example of the selection switches of the drive electrode driver according to the second embodiment. The same constituent elements as the first embodiment are labeled with the same reference numerals, and the duplicated descriptions thereof are omitted. In FIGS. 25 and 26, the configuration on the first gate driver 12A side is described. The configuration on the second gate driver 12B side is the same as that on the first gate driver 12A side.

As illustrated in FIG. 23, the pixel substrate 2 includes, on the surface of the TFT substrate 21 of a transparent insulation substrate (e.g., a glass substrate), the display area Ad in which a large number of pixels including liquid crystal cells are arranged in a matrix (rows and columns), the source driver (horizontal drive circuit) 13, and the gate drivers (vertical drive circuits) 12A and 12B. The gate drivers (vertical drive circuits) 12A and 12B are arranged as the first gate driver 12A and the second gate driver 12B with the display area Ad interposed therebetween. The first gate driver 12A and the second gate driver 12B alternately apply the vertical scan pulse to the scan line GCL in the scan direction to select the respective sub-pixels SPix in the display area Ad row by row. The first gate driver 12A and the second gate driver 12B are arranged at the ends of the scan line GSL in the longitudinal direction and alternately apply the vertical scan pulse to every other scan line GCL to select the respective pixels in the display area Ad row by row.

As illustrated in FIG. 24, the number of scan lines GCL reaching the first gate driver 12A or the second gate driver 12B after passing over the display area Ad and through the frame Gd is smaller than that in the first embodiment. As a result, the odd-number-th scan lines GCL coupled to the first gate driver 12A pass through the frame Gd and into the display area Ad and the even-number-th scan lines GCL coupled to the second gate driver 12B pass through the frame Gd and into the display area Ad. As a result, the CMOS switch CMOS1 of the selection switch SW1 is disposed in an area between the scan lines GCL (e.g., the scan lines $GCL_{m+1}$ and $GCL_{m+3}$) intersecting with the touch wiring LAC (the display wiring LDC) in a grade separation manner. For example, the scan lines GCL coupled to the first gate driver 12A (e.g., the scan lines $GCL_{m+1}$ and $GCL_{m+3}$) intersect with the touch wiring LAC on the first gate driver 12A side in a grade separation manner but do not intersect with the touch wiring LAC on the second gate driver 12B side in a grade separation manner. The scan lines GCL coupled to the second gate driver 12B (e.g., the scan lines $GCL_{m+2}$ and $GCL_{m+4}$) intersect with the touch wiring LAC on the second gate driver 12B side in a grade separation manner but do not intersect with the touch wiring LAC on the first gate driver 12A side in a grade separation manner. The distance between the scan lines GCL intersecting with the touch wiring LAC (the display wiring LDC) in a grade separation manner is larger than that between the adjacent scan lines GCL in the display area Ad. In other words, the distance between the scan lines GCL in the frame Gd is larger than that between the adjacent scan lines GCL in the display area Ad. With an increase in distance between the scan lines GCL in the frame Gd, an area increases in which the selection switch SW1 (the CMOS switches CMOS1 and CMOS2) can be disposed. The increase in number or in area of connecting conductors Q1, Q2, and Q3 can reduce the interconnection resistance of the selection switch SW1.

The selection switch SW1 is disposed not only in the frame area Gd on the first gate driver 12A side but also in the frame area Gd on the second gate driver 12B side. The selection switch SW1 disposed in the frame area Gd on the second gate driver 12B side can select the connection between the touch wiring LAC disposed on the second gate driver 12B side and the electrodes COML or the connection between the display wiring LDC disposed on the second gate driver 12B side and the electrodes COML. In this case, the selection switch on the first gate driver 12A side and the selection switch on the second gate driver 12B side that are coupled to the same drive electrode COML select the same type of the wiring (the touch wiring LAC or the display wiring LDC). For example, the selection switch SW1 on the second gate driver 12B side coupled to the same drive electrode COML as the selection switch SW1 on the first gate driver 12A side selects the connection between the touch wiring LAC and the drive electrode COML when the selection switch SW1 on the first gate driver 12A side selects the connection between the touch wiring LAC and the drive electrode COML. The selection switch SW1 on the second gate driver 12B side coupled to the same drive electrode COML as the selection switch SW1 on the first gate driver 12A side selects the connection between the display wiring LDC and the drive electrode COML when the selection switch SW1 on the first gate driver 12A side selects the connection between the display wiring LDC and the drive electrode COML.

Advantages

The reduction in pixel pitches with an increase in accuracy may increase the interconnection resistance of the selection switch SW1 when the selection switch SW1 is disposed between the scan lines GCL the distance of which corresponds to the pitch between the sub-pixels SPix as described in the first embodiment. In contrast, the display device with a touch detection function 1 according to the second embodiment can keep the interconnection resistance of the selection switch SW1 low even if the pixel pitches are reduced with an increase in accuracy because the selection switch SW1 can be disposed between the scan lines GCL the distance of which is larger than the pitch between the sub-pixels SPix. In addition, the interconnection resistance in the selection switch SW1 can be reduced by increasing the number of connecting conductors Q1, Q2, and Q3, which supply power.

The touch wiring LAC has a predetermined interconnection resistance component of the switch SW1 and a parasitic capacitance between itself and the drive electrodes COML included in the drive electrode block B to which the drive signal VcomAC is applied through the touch wiring LAC. Thus, the transition time of the pulse of the drive signal VcomAC may get longer at the drive electrode block B disposed away from the COG 19 (drive signal generator). The multiple CMOS switches CMOS1 and CMOS2 of the switch COMSW of the selection switch SW1 (as a representative example of the switches SW1, SW2, SW3, and SW4) according to the second embodiment are provided in parallel with each other between the touch wiring LAC and the drive electrode COML, for each drive electrode COML. All of the CMOS switches CMOS1 and CMOS2 operate in response to the switch control signals serving as the selection signals to couple the touch wiring LAC to the drive electrodes COML, and can supply the touch drive signal VcomAC to the drive electrode COML. The display device with a touch detection function 1 according to the second embodiment reduces the potentiality that the transition time of the pulse of the drive signal VcomAC gets longer at the drive electrode block B disposed near the end of the touch wiring LAC because the interconnection resistance of the selection switch SW1 is reduced.

The selection switch SW1 according to the second embodiment can be reduced in size in a direction in parallel with the scan line and can be increased in size in a direction perpendicular to the scan line. As a result, in the display device with a touch detection function 1 according to the second embodiment, the width Gdv in the frame Gd illustrated in FIG. 7 can be reduced. The width Gdv is the width of the area in parallel with the scan line in the frame Gd and in which area the selection switch SW1 is disposed.

1-3. Third Embodiment

Figure 27:
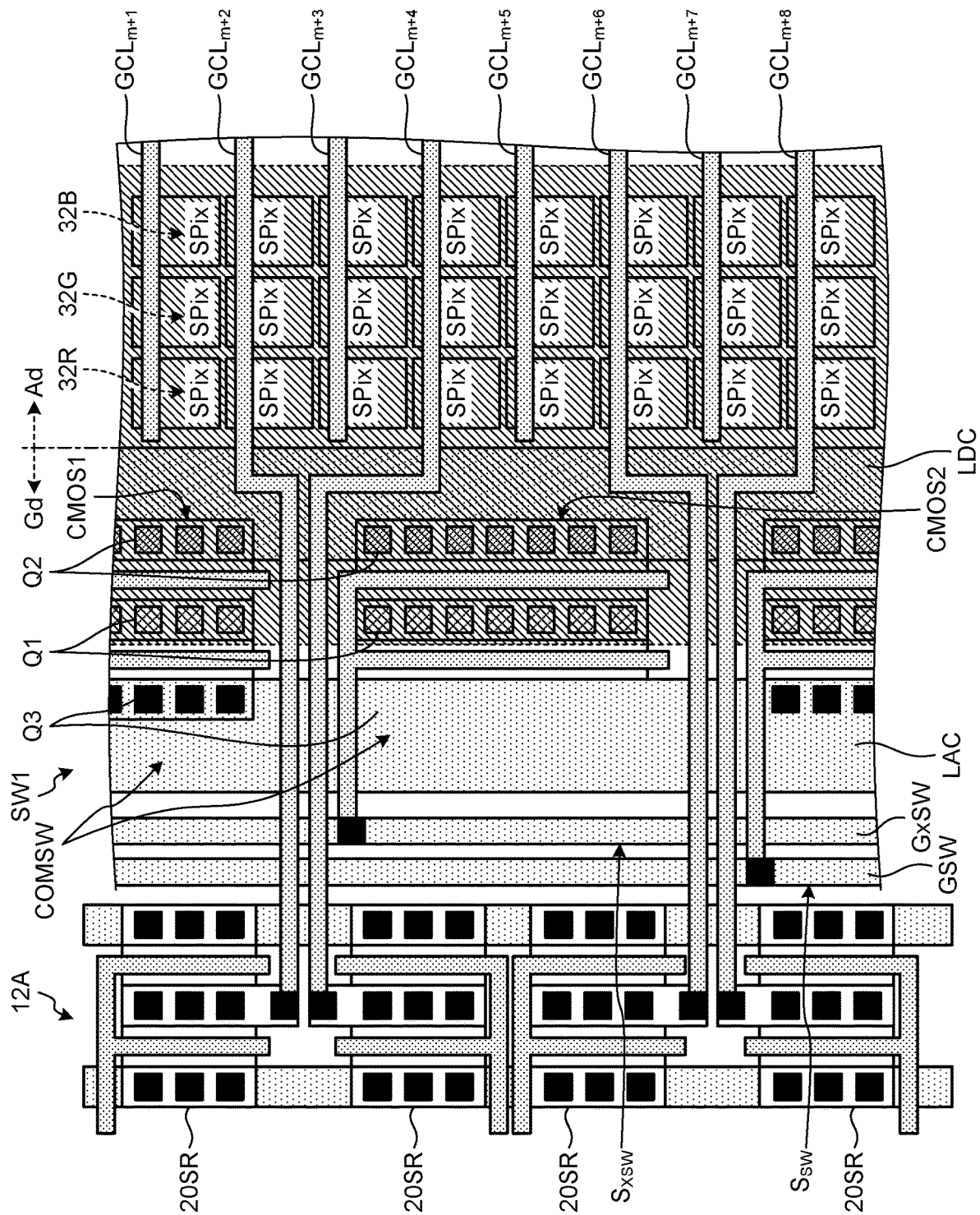
FIG. 27 is a block diagram illustrating an arrangement example of the selection switches of the drive electrode driver according to the third embodiment.

The following describes the display device with a touch detection function 1 according to a third embodiment. FIG. 26 is a block diagram illustrating the drive unit of the drive electrode driver according to the third embodiment. FIG. 27 is a block diagram illustrating an arrangement example of the selection switches of the drive electrode driver according to the third embodiment. The same constituent elements as the first and the second embodiments are labeled with the same reference numerals, and the duplicated descriptions thereof are omitted. In FIGS. 25 and 26, the drive electrode driver on the first gate driver 12A side is described. The configuration on the second gate driver 12B side is the same as that on the first gate driver 12A side.

As illustrated in FIG. 23, the pixel substrate 2 includes, on the surface of the TFT substrate 21 of a transparent insulation substrate (e.g., a glass substrate), the display area Ad in which a large number of pixels including liquid crystal cells are arranged in a matrix (rows and columns), the source driver (horizontal drive circuit) 13, and the gate drivers (vertical drive circuits) 12A and 12B, also in the third embodiment. The gate drivers (vertical drive circuits) 12A and 12B are arranged as the first gate driver 12A and the second gate driver 12B with the display area Ad interposed therebetween. The first gate driver 12A and the second gate driver 12B alternately apply the vertical scan pulse to the scan line in the scan direction to select the respective sub-pixels SPix in the display area Ad row by row.

As illustrated in FIG. 26, the number of scan lines GCL reaching the first gate driver 12A or the second gate driver 12B after passing over the display area Ad and through the frame Gd is smaller than that in the first embodiment. The plurality of scan lines are arranged between the adjacent switches COMSW. For example, the scan lines $GCL_{m+2}$ and $GCL_{m+4}$ are arranged between the adjacent switches COMSW, and the scan lines $GCL_{m+6}$ and $GCL_{m+8}$ are arranged between the adjacent switches COMSW. The arrangement pitch of the scan lines arranged in such a manner coincides with the arrangement pitch of the gate shift registers 120SR of the first gate driver 12A (the second gate driver 12B). The gate shift registers 120SR control two scan lines GCL as a pair. In the selection switch SW1, the space for the switch COMSW corresponds to four arrangement pitches of the sub-pixels SPix and the repeating pitch of the switch COMSW corresponds to eight arrangement pitches of the sub-pixels SPix. As a result, the even-number-th scan lines GCL coupled to the first gate driver 12A pass through the frame Gd and into the display area Ad and the odd-number-th scan lines GCL coupled to the second gate driver 12B pass through the frame Gd and into the display area Ad. As a result, the CMOS switch CMOS2 is disposed in an area between the scan lines GCL that intersect with the touch wiring LAC (the display wiring LDC) in a grade separation manner and adjacent to the CMOS switches CMOS1 and CMOS2 (e.g., between the scan lines $GCL_{m+4}$ and $GCL_{m+6}$). For example, the scan lines GCL (e.g., the scan lines $GCL_{m+2}$, $GCL_{m+4}$, $GCL_{m+6}$, and $GCL_{m+8}$) coupled to the first gate driver 12A intersect with the touch wiring LAC on the first gate driver 12A side in a grade separation manner but do not intersect with the touch wiring LAC on the second gate driver 12B side in a grade separation manner. The scan lines GCL coupled to the second gate driver 12B (e.g., the scan lines $GCL_{m+1}$, $GCL_{m+3}$, $GCL_{m+5}$, and $GCL_{m+7}$) intersect with the touch wiring LAC on the second gate driver 12B side in a grade separation manner but do not intersect with the touch wiring LAC on the first gate driver 12A side in a grade separation manner. The distance between the scan lines GCL intersecting with the touch wiring LAC (the display wiring LDC) in a grade separation manner is larger than that between the adjacent scan lines GCL in the display area Ad. With an increase in distance between the scan lines GCL in the frame Gd, an area increases in which the selection switch SW1 (the CMOS switch CMOS2) can be disposed. The increase in number or in area of connecting conductors Q1, Q2, and Q3 can reduce the interconnection resistance of the selection switch SW1, for example.

The selection switch SW1 is disposed not only in the frame area Gd on the first gate driver 12A side but also in the frame area Gd on the second gate driver 12B side. The selection switch SW1 disposed in the frame area Gd on the second gate driver 12B side can select the connection between the touch wiring LAC disposed on the second gate driver 12B side and the electrodes COML or the connection between the display wiring LDC disposed on the second gate driver 12B side and the electrodes COML. In this case, the selection switch on the first gate driver 12A side and the selection switch on the second gate driver 12B side that are coupled to the same drive electrode COML select the same type of the wiring (the touch wiring LAC or the display wiring LDC). For example, the selection switch SW1 on the second gate driver 12B side coupled to the same drive electrode COML as the selection switch SW1 on the first gate driver 12A side selects the connection between the touch wiring LAC and the drive electrode COML when the selection switch SW1 on the first gate driver 12A side selects the connection between the touch wiring LAC and the drive electrode COML. The selection switch SW1 on the second gate driver 12B side coupled to the same drive electrode COML as the selection switch SW1 on the first gate driver 12A side selects the connection between the display wiring LDC and the drive electrode COML when the selection switch SW1 on the first gate driver 12A side selects the connection between the display wiring LDC and the drive electrode COML.

Advantages

The reduction in pixel pitches with an increase in accuracy may increase the interconnection resistance of the selection switch SW1 when the selection switch SW1 is disposed in the scan lines GCL the distance of which corresponds to the pitch between the sub-pixels SPix as described in the first embodiment. In contrast, display device with a touch detection function 1 according to the third embodiment can keep the interconnection resistance of the selection switch SW1 low even if the pixel pitches are reduced with an increase in accuracy because the selection switch SW1 can be disposed between the scan lines GCL the distance of which is larger than the pitch between the sub-pixels SPix. In addition, the interconnection resistance in the selection switch SW1 can be reduced by increasing the number of connecting conductors Q1, Q2, and Q3, which supply power.

The touch wiring LAC has a predetermined interconnection resistance component of the switch SW1 and a parasitic capacitance between itself and the drive electrodes COML included in the drive electrode block B to which the drive signal VcomAC is applied through the touch wiring LAC. Thus, the transition time of the pulse of the drive signal VcomAC may get longer at the drive electrode block B disposed away from the COG 19 (drive signal generator). The multiple CMOS switches CMOS1 and CMOS2 of the switch COMSW of the selection switch SW1 (as a representative example of the switches Sw1, SW2, SW3, and SW4) according to the third embodiment are provided in parallel with each other between the touch wiring LAC and the drive electrode COML, for each drive electrode COML. All of the CMOS switches CMOS1 and CMOS2 operate in response to the switch control signals serving as the selection signals to couple the touch wiring LAC to the corresponding drive electrode COML, and can supply the touch drive signal VcomAC to the drive electrode COML. The display device with a touch detection function 1 according to the third embodiment reduces the potentiality that the transition time of the pulse of the drive signal VcomAC gets longer at the drive electrode block B disposed near the end of the touch wiring LAC because the interconnection resistance of the selection switch SW1 is reduced.

The selection switch SW1 according to the third embodiment can be reduced in size in a direction in parallel with the scan line and can be increased in size in a direction perpendicular to the scan line. As a result, in the display device with a touch detection function 1 according to the third embodiment, the width Gdv in the frame Gd illustrated in FIG. 7 can be reduced. The width Gdv is the width of the area in parallel with the scan line in the frame Gd and in which area the selection switch SW1 is disposed.

The present disclosure is not limited to the embodiments and the modifications described above and can be modified in various ways.

Figure 28:
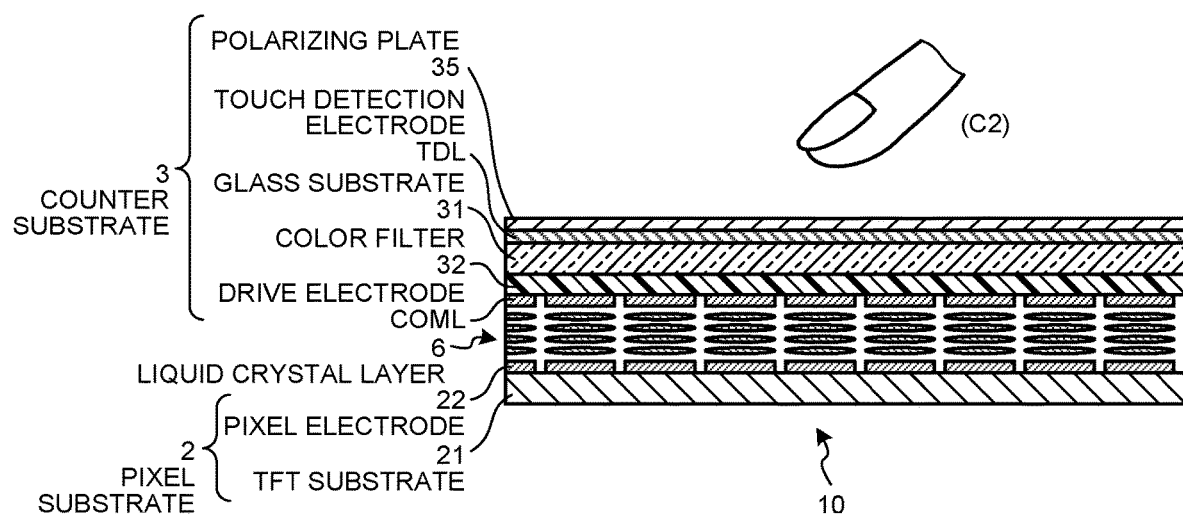
FIG. 28 is a cross-sectional diagram illustrating a schematic cross-sectional structure of the display unit with a touch detection function according to a modification.

The display device with a touch detection function 1 according to the embodiments and the modifications described above can include the display unit with a touch detection function 10 that is configured by integrating the touch detection device 30 and the liquid crystal display unit 20 using a liquid crystal of various modes such as FFS and IPS. FIG. 28 is a cross-sectional diagram illustrating a schematic cross-sectional structure of the display unit with a touch detection function according to a modification. The display unit with a touch detection function 10 according to the modification illustrated in FIG. 28 may be configured by integrating the touch detection device and a liquid crystal of various modes such as twisted nematic (TN), vertical alignment (VA), and electrically controlled birefringence (ECB) modes.

As illustrated in FIG. 28, the touch wiring LAC and the display wiring LDC may be provided to the counter substrate 3 when the drive electrodes COML are provided to the counter substrate 3. With this configuration, the distance between the drive electrodes COML and the touch wiring LAC (the display wiring LDC) is shortened. The scan lines GCL provided to the TFT substrate 21 intersect with the touch wiring LAC and the display wiring LDC in a grade separation manner in the same manner as the first, the second, and the third embodiments. As a result, the touch wiring LAC is provided in the frame area Gd located outside the display area Ad in the direction perpendicular to the TFT substrate 21.

In the embodiments described above, the display unit with a touch detection function 10 is an in-cell type, in which the liquid crystal display unit 20 and the electrostatic capacitance touch detection device 30 are integrated. The display unit with a touch detection function 10 however is not limited to this type. The display unit with a touch detection function 10 may be an on-cell type in which the electrostatic capacitance touch detection device 30 is attached on the liquid crystal display unit 20. In the on-cell type, the drive electrodes COML of the pixel substrate 2 illustrated in FIG. 8 operates as first drive electrodes COML, and second drive electrodes COML are provided on the surface of the glass substrate 31, and the first and the second drive electrodes are electrically coupled. In this case, the use of the configuration described above enables the touch detection to be performed without being influenced by the external noises and the noises propagated from the liquid crystal display device (corresponding to the internal noises in the embodiments).

2. Application Examples

The following describes application examples of the display device with a touch detection function 1 described in the embodiments and the modification with reference to FIGS. 29 to 41. FIGS. 29 to 41 are schematic diagrams illustrating examples of an electronic apparatus to which the display device with a touch detection function according to the embodiments is applied. The display device with a touch detection function 1 according to the first, the second, and the third embodiments can be applied to all the fields of electronic apparatuses such as television apparatuses, digital cameras, notebook personal computers, portable terminals such as portable phones, and video cameras. In other words, the display device with a touch detection function 1 according to the first, the second, and the third embodiments and the modification can be applied to all the fields of electronic apparatuses displaying an externally input video signal or an internally generated image signal as an image or a video.

2-1. Application Example 1

Figure 29:
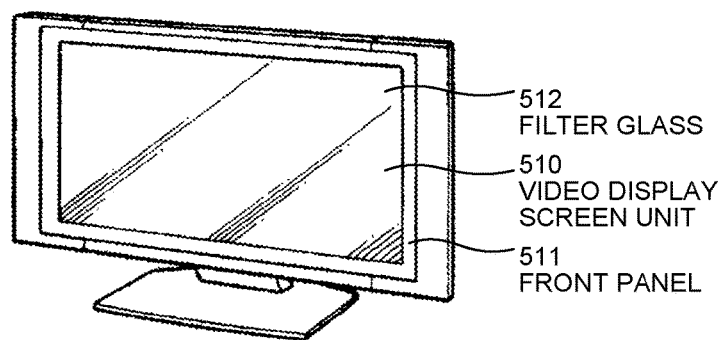
FIG. 29 is a schematic diagram illustrating an example of an electronic apparatus to which the display device with a touch detection function according to the embodiments is applied.

The electronic apparatus illustrated in FIG. 29 is a television apparatus to which the display device with a touch detection function 1 according to the first, the second, and the third embodiments and the modification is applied. The television apparatus includes a video display screen unit 510 having a front panel 511 and a filter glass 512, for example. The video display screen unit 510 is the display device with a touch detection function according to the first, the second, and the third embodiments and the modification.

2-2. Application Example 2

Figure 30:
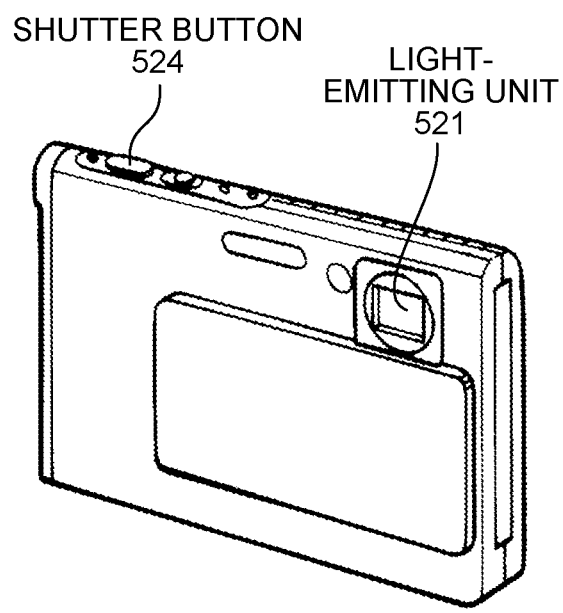
FIG. 30 is a schematic diagram illustrating an example of an electronic apparatus to which the display device with a touch detection function according to the embodiments is applied.
Figure 31:
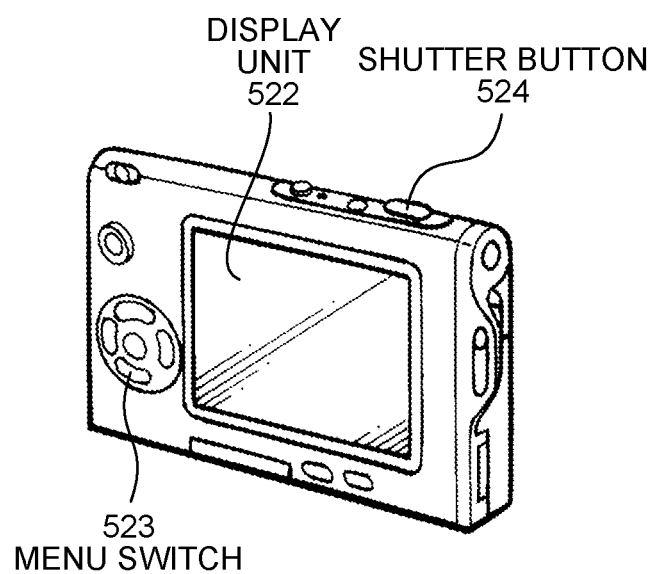
FIG. 31 is a schematic diagram illustrating an example of an electronic apparatus to which the display device with a touch detection function according to the embodiments is applied.

The electronic apparatus illustrated in FIGS. 30 and 31 is a digital camera to which the display device with a touch detection function 1 according to the first, the second, and the third embodiments and the modification is applied. The digital camera includes a light-emitting unit 521 for flash, a display unit 522, a menu switch 523, and a shutter button 524, for example. The display unit 522 is the display device with a touch detection function according to the first, the second, and the third embodiments and the modification.

2-3. Application Example 3

Figure 32:
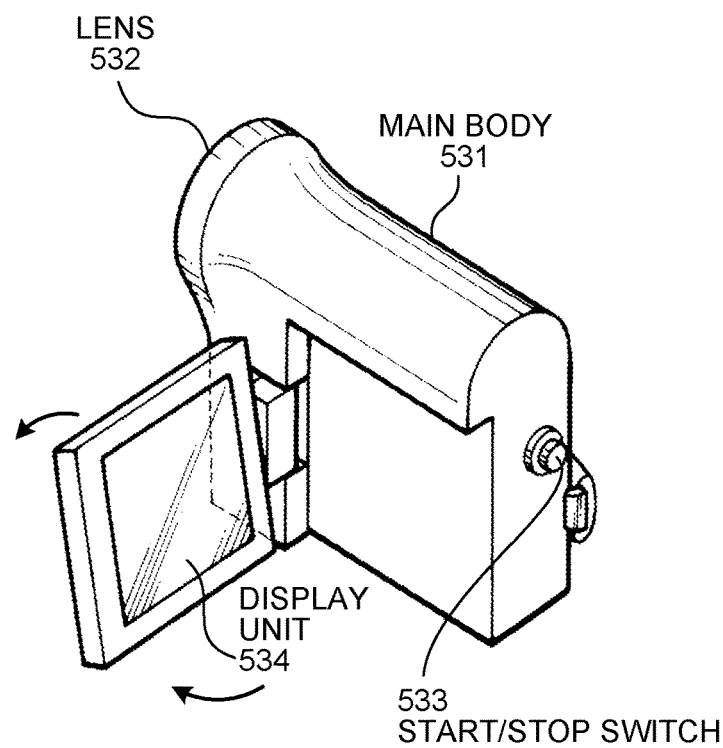
FIG. 32 is a schematic diagram illustrating an example of an electronic apparatus to which the display device with a touch detection function according to the embodiments is applied.

FIG. 32 illustrates an outer appearance of a video camera to which the display device with a touch detection function 1 according to the first, the second, and the third embodiments and the modification is applied. The video camera includes a main body 531, a subject photographing lens 532 disposed on the front side surface of the main body 531, a photographing start/stop switch 533, and a display unit 534, for example. The display unit 534 is the display device with a touch detection function according to the first, the second, and the third embodiments and the modification.

2-4. Application Example 4

Figure 33:
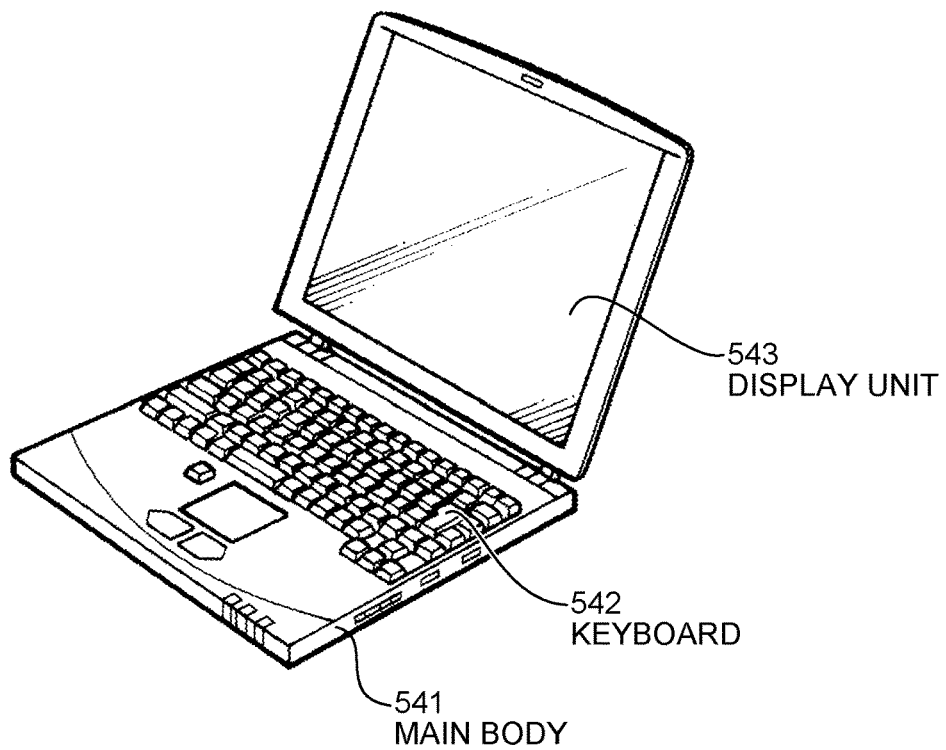
FIG. 33 is a schematic diagram illustrating an example of an electronic apparatus to which the display device with a touch detection function according to the embodiments is applied.
Figure 34:
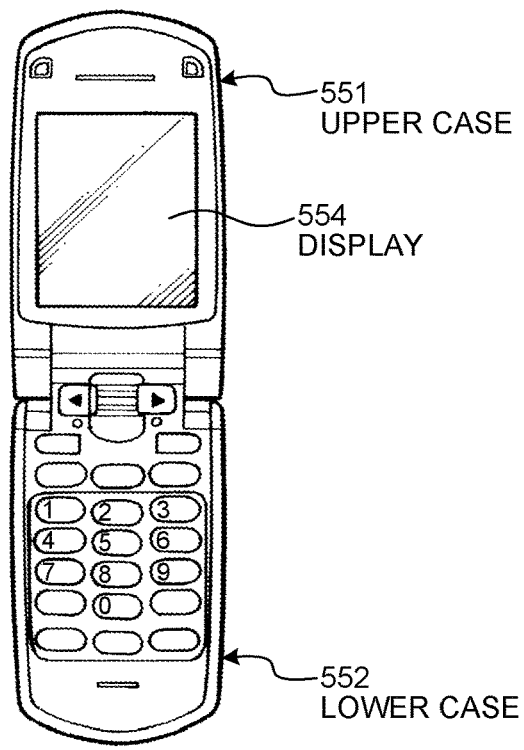
FIG. 34 is a schematic diagram illustrating an example of an electronic apparatus to which the display device with a touch detection function according to the embodiments is applied.
Figure 35:
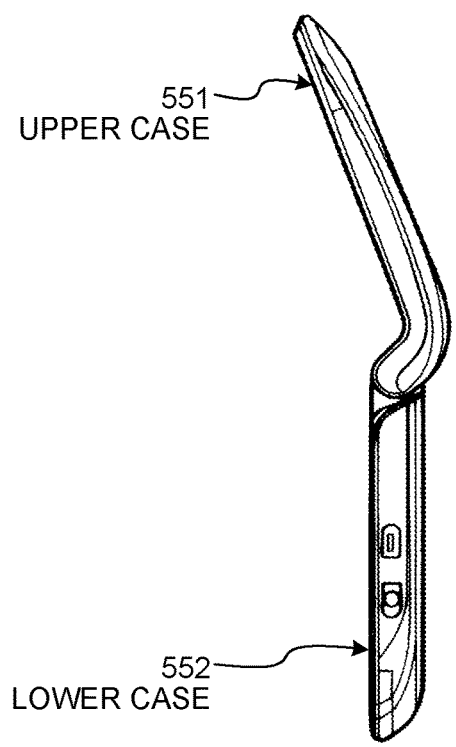
FIG. 35 is a schematic diagram illustrating an example of an electronic apparatus to which the display device with a touch detection function according to the embodiments is applied.
Figure 36:
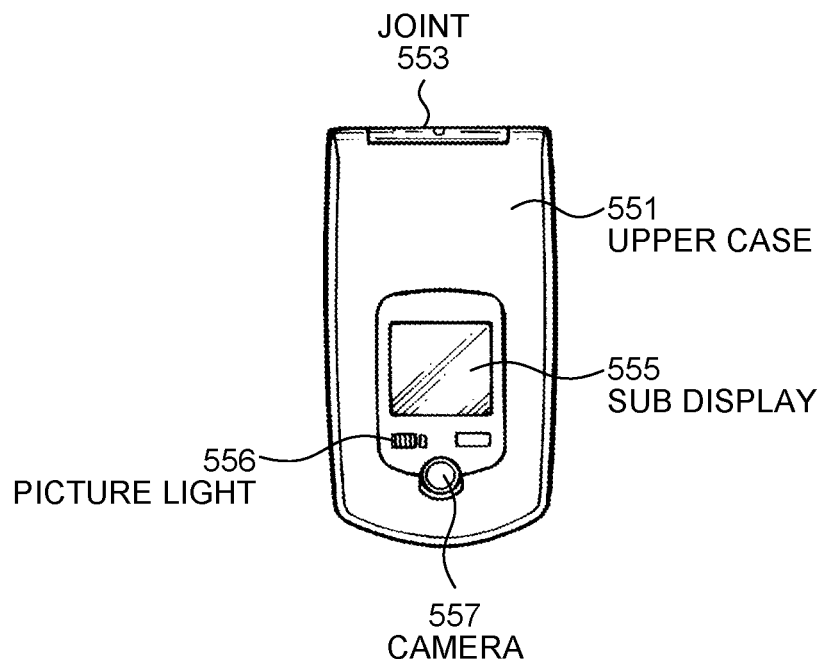
FIG. 36 is a schematic diagram illustrating an example of an electronic apparatus to which the display device with a touch detection function according to the embodiments is applied.
Figure 37:
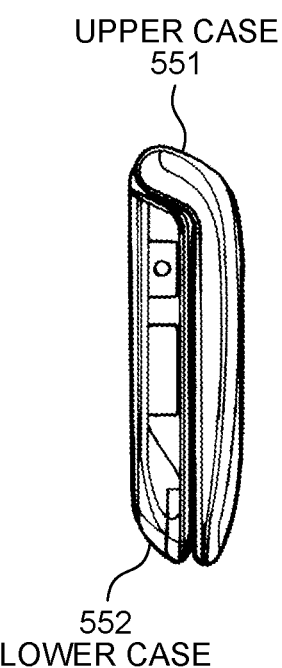
FIG. 37 is a schematic diagram illustrating an example of an electronic apparatus to which the display device with a touch detection function according to the embodiments is applied.
Figure 38:
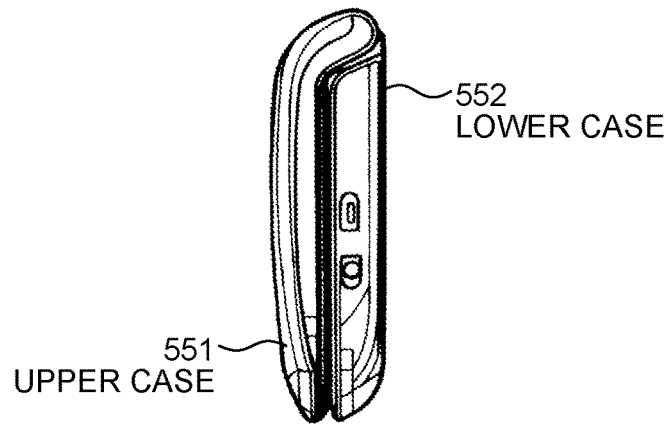
FIG. 38 is a schematic diagram illustrating an example of an electronic apparatus to which the display device with a touch detection function according to the embodiments is applied.
Figure 39:
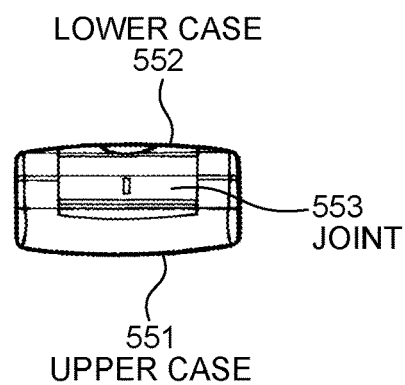
FIG. 39 is a schematic diagram illustrating an example of an electronic apparatus to which the display device with a touch detection function according to the embodiments is applied.
Figure 40:
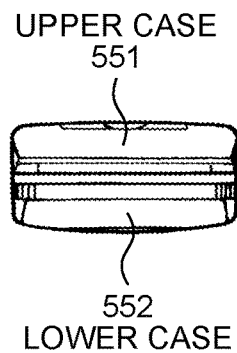
FIG. 40 is a schematic diagram illustrating an example of an electronic apparatus to which the display device with a touch detection function according to the embodiments is applied.

The electronic apparatus illustrated in FIG. 33 is a notebook personal computer to which the display device with a touch detection function 1 according to the first, the second, and the third embodiments and the modification is applied. The notebook personal computer includes a main body 541, a keyboard 542 for input operation of characters, and a display unit 543 displaying an image, for example. The display unit 543 is the display device with a touch detection function according to the first, the second, and the third embodiments and the modification.

2-5. Application Example 5

The electronic apparatus illustrated in FIGS. 34 to 40 is a portable phone to which the display device with a touch detection function 1 according to the first, the second, and the third embodiments and the modification is applied. The portable phone includes an upper case 551 and a lower case 552 that are coupled with a joint (hinge) 553, a display 554, a sub display 555, a picture light 556, and a camera 557, for example. The display 554 or the sub display 555 is the display device with a touch detection function according to the first, the second, and the third embodiments and the modification.

2-6. Application Example 6

Figure 41:
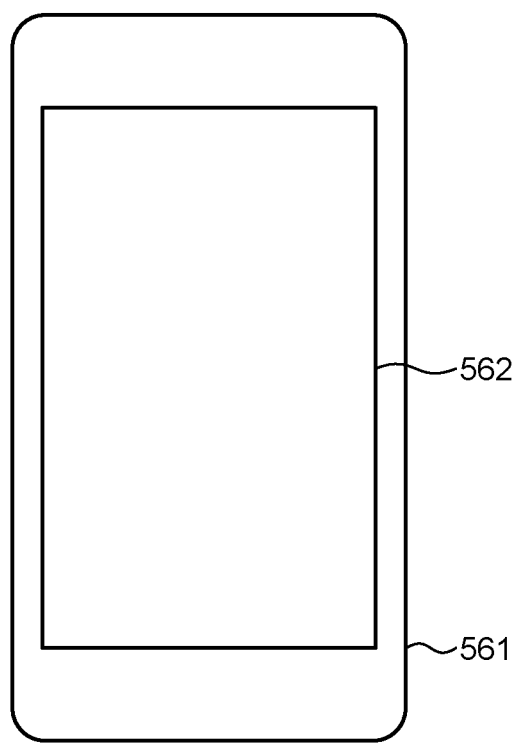
FIG. 41 is a schematic diagram illustrating an example of an electronic apparatus to which the display device with a touch detection function according to the embodiments is applied.

The electronic apparatus illustrated in FIG. 41 is an information portable terminal that operates as a portable computer, a multi-functional portable phone, a portable computer having a voice communication function, or a portable computer having a communication function, and is called a smartphone or a tablet terminal. The information portable terminal includes a housing 561 having a display unit 562 on the surface thereof, for example. The display unit 562 is the display device with a touch detection function 1 according to the first, the second, and the third embodiments and the modification.

3. Aspects of the Present Disclosure

The present disclosure includes the following aspects.

(1) A display device with a touch detection function, comprising:
 a display area including a plurality of pixel electrodes arranged in a matrix on a substrate;
 a plurality of drive electrodes that are disposed to face the plurality of pixel electrodes;
 a display function layer that has an image display function to display an image in the display area;
 a controller that performs image display control to fulfill the image display function of the display function layer by applying a display drive voltage between the plurality of pixel electrodes and the plurality of drive electrodes based on an image signal;
 a plurality of touch detection electrodes that face the plurality of drive electrodes, and form an electrostatic capacitance between the plurality of drive electrodes and the plurality of touch detection electrodes;
 a touch detection unit that detects a position of an approaching object based on a detection signal from the plurality of touch detection electrodes;
 touch wiring that is routed in a frame area located outside the display area and supplies a touch drive signal to the plurality of drive electrodes; and
 a plurality of switch groups that are provided for each of the plurality of drive electrodes, each of the plurality of switch groups having a plurality of selection switches that operate based on a selection signal from the controller, wherein
 the plurality of switch groups select a drive electrode to be coupled to the touch wiring from the plurality of drive electrodes based on a selection signal from the controller, and
 the plurality of selection switches for each of the plurality of switch groups are coupled in parallel with each other between a corresponding drive electrode and the touch wiring, and for each of the plurality of drive electrodes, all of the plurality of selection switches operate in accordance with the selection signal, couple the corresponding drive electrodes and the touch wiring, and apply the touch drive signal to the corresponding drive electrodes.

(2) The display device with a touch detection function according to (1), wherein
 the controller includes a vertical drive circuit,
 the vertical drive circuit is coupled to a plurality of scan lines that select pixels in a row unit, and
 the plurality of scan lines intersect with the touch wiring in a grade separation manner and the selection switches are arranged in an area between the adjacent scan lines.

(3) The display device with a touch detection function according to (2), wherein
 the vertical drive circuit includes a first vertical drive circuit and a second vertical drive circuit,
 the first and the second vertical drive circuits are disposed at ends of the plurality of scan lines in a longitudinal direction of the plurality of scan lines and select the respective pixels in the display area row by row by alternately applying a vertical scan pulse to every other scan line, and
 a distance between the scan lines intersecting with the touch wiring in a grade separation manner is larger than a distance between the adjacent scan lines in the display area.

(4) The display device with a touch detection function according to (2), wherein
 the vertical drive circuit includes a first vertical circuit and a second vertical circuit,
 the first and the second vertical drive circuits are disposed with the plurality of scan lines interposed therebetween in an extending direction of the plurality of scan lines, and select the respective pixels in the display area row by row by alternately applying a vertical scan pulse to the scan lines in a scan direction,
 the scan lines are arranged between the adjacent selection switches, and
 a distance between the scan lines intersecting with the touch wiring in a grade separation manner and being adjacent to the selection switch is larger than a distance between the adjacent scan lines in the display area.

(5) The display device with a touch detection function according to (3), wherein
 the touch wiring includes first touch wiring on the first vertical drive circuit side and second touch wiring on the second vertical drive circuit side,
 the scan lines coupled to the first vertical drive circuit intersect with the first touch wiring on the first vertical drive circuit side in a grade separation manner and do not intersect with the second touch wiring on the second vertical drive circuit side in a grade separation manner, and
 the scan lines coupled to the second vertical drive circuit intersect with the second touch wiring on the second vertical drive circuit side in a grade separation manner and do not intersect with the first touch wiring on the first vertical drive circuit side in a grade separation manner.

(6) The display device with a touch detection function according to (4), wherein
 the touch wiring includes first touch wiring on the first vertical drive circuit side and second touch wiring on the second vertical drive circuit side,
 the scan lines coupled to the first vertical drive circuit intersect with the first touch wiring on the first vertical drive circuit side in a grade separation manner and do not intersect with the second touch wiring on the second vertical drive circuit side in a grade separation manner, and
 the scan lines coupled to the second vertical drive circuit intersect with the second touch wiring on the second vertical drive circuit side in a grade separation manner and do not intersect with the first touch wiring on the first vertical drive circuit side in a grade separation manner.

(7) The display device with a touch detection function according to (2), wherein a distance between the scan lines intersecting with the touch wiring in a grade separation manner is a distance between the adjacent scan lines in the display area.

(8) The display device with a touch detection function according to (1), further comprising:

display wiring that supplies the display drive voltage, wherein the display wiring is disposed closer to the display area than the touch wiring.

(9) The display device with a touch detection function according to (8), wherein the plurality of selection switches select either a connection between the plurality of drive electrodes and the display wiring or a connection between the plurality of drive electrodes and the touch wiring in a time-division manner.

(10) An electronic apparatus having a display device with a touch detection function capable of detecting an externally approaching object, the display device with a touch detection function comprising:

a display area including a plurality of pixel electrodes arranged in a matrix on a substrate;

a plurality of drive electrodes that are disposed to face the plurality of pixel electrodes a display function layer that has an image display function to display an image in the display area;

a controller that performs image display control to fulfill the image display function of the display function layer by applying a display drive voltage between the plurality of pixel electrodes and the plurality of drive electrodes based on an image signal;

a plurality of touch detection electrodes that face the plurality of drive electrodes, and form an electrostatic capacitance between the plurality of drive electrodes and the plurality of touch detection electrodes;

a touch detection unit that detects a position of an approaching object based on a detection signal from the plurality of touch detection electrodes;

touch wiring that is routed in a frame area located outside the display area and supplies a touch drive signal to the plurality of drive electrodes; and a plurality of switch groups that are provided for each of the plurality of drive electrodes, each of the plurality of switch groups having a plurality of selection switches that operate based on a selection signal from the controller, wherein the plurality of switch groups select a drive electrode to be coupled to the touch wiring from the plurality of drive electrodes based on a selection signal from the controller, and the plurality of selection switches for each of the plurality of switch groups are coupled in parallel with each other between a corresponding drive electrode and the touch wiring, and for each of the plurality of drive electrodes, all of the plurality of selection switches operate in accordance with the selection signal, couple the corresponding drive electrodes and the touch wiring, and apply the touch drive signal to the corresponding drive electrodes.

The display device with a touch detection function and the electronic apparatus according to the disclosure can reduce the interconnection resistances of the selection switches that select the drive electrode to which the drive signal is applied and also reduce the frame in size.

Examples of the electronic apparatus include, but are not limited to, a television device, a digital camera, a personal computer, a video camera, and a portable terminal device such as a portable phone.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function, comprising:

a display area including a plurality of pixels arranged in a matrix on a substrate;

a plurality of drive electrodes disposed to face at least one of the pixels;

a display function layer that has an image display function to display an image in the display area;

touch wiring that is routed in a frame area located outside the display area and supplies an alternating current touch drive signal to the drive electrodes;

display wiring that supplies a display drive voltage; and a plurality of switches conducting between at least one of the drive electrodes and the touch wiring in a touch detection period, and conducting between at least one of the drive electrodes and the display wiring in a display period, wherein the display wiring is disposed closer to the display area than the touch wiring.

2. The display device with a touch detection function according to claim 1, further comprising a first gate driver, a second gate driver, and a plurality of scan lines, wherein the first and second gate drivers are disposed with the scan lines interposed therebetween in an extending direction of the scan lines, wherein the touch wiring includes first touch wiring on a first gate driver side and second touch wiring on a second gate driver side, wherein the plurality of switches include a plurality of switches on the first gate driver side and a plurality of switches on the second gate driver side, wherein the scan lines include a plurality of first scan lines that intersect with the first touch wiring in a grade separation manner and a plurality of second scan lines that intersect with the second touch wiring in a grade separation manner, and wherein the switches on the first driver side are each arranged in an area between adjacent first scan lines in the plurality of first scan lines, and the switches on the second driver side are each arranged in an area between adjacent second scan lines in the plurality of second scan lines.

3. The display device with a touch detection function according to claim 2, wherein a distance between the adjacent first scan lines and a distance between the adjacent second scan lines are each larger than a distance between adjacent scan lines in the plurality of scan lines in the display area.

4. The display device with a touch detection function according to claim 2, wherein a distance between the scan lines intersecting with the touch wiring in a grade separation manner is a distance between adjacent scan lines of the plurality of scan lines in the display area.

5. The display device with a touch detection function according to claim 2, wherein at least two scan lines in the plurality of scan lines are arranged between adjacent switches of the plurality of switches.

6. The display device with a touch detection function according to claim 1, wherein each of the drive electrodes is provided corresponding to one or more switches of the plurality of switches, and wherein the one or more switches provided for the drive electrode select either a connection between the drive electrode and the display wiring or a connection between the drive electrode and the touch wiring in a time-division manner.

7. The display device with a touch detection function according to claim 1, wherein each of the switches is coupled to a corresponding drive electrode with a first connecting conductor and coupled to a corresponding piece of the first and second touch wiring with a second connecting conductor.

8. The display device with a touch detection function according to claim 1, wherein the switches are divided into a plurality of switch groups that are provided corresponding to the drive electrodes, and wherein each of the switch groups includes a first switch for applying a first voltage to a corresponding drive electrode in the drive electrodes and a second switch for applying a second voltage to the corresponding drive electrode.

9. The display device with a touch detection function according to claim 1, wherein the display wiring is provided with a direct-current voltage, and the touch wiring is provided with an alternating-current voltage.

10. An electronic apparatus having a display device with a touch detection function capable of detecting an externally approaching object, the display device with a touch detection function comprising:

a display area including a plurality of pixels arranged in a matrix on a substrate;

a plurality of drive electrodes disposed to face at least one of the pixels;

a display function layer that has an image display function to display an image in the display area;

touch wiring that is routed in a frame area located outside the display area and supplies an alternating current touch drive signal to the drive electrodes;

display wiring that supplies a display drive voltage; and a plurality of switches conducting between at least one of the drive electrodes and the touch wiring in a touch detection period, and conducting between at least one of the drive electrodes and the display wiring in a display period, wherein the display wiring is disposed closer to the display area than the touch wiring.

11. The electronic apparatus according to claim 10, wherein the display wiring is provided with a direct-current voltage, and the touch wiring is provided with an alternating-current voltage.

* * * * *